(12) United States Patent
Takizawa et al.

(10) Patent No.: US 10,661,670 B2
(45) Date of Patent: May 26, 2020

(54) POWER SUPPLY SYSTEM, TRANSPORTATION APPARATUS, AND POWER TRANSMISSION METHOD

(71) Applicant: HONDA MOTOR CO., LTD., Tokyo (JP)

(72) Inventors: Daijiro Takizawa, Wako (JP); Hirokazu Oguma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 15/472,276

(22) Filed: Mar. 29, 2017

(65) Prior Publication Data
US 2017/0282899 A1    Oct. 5, 2017

(30) Foreign Application Priority Data

Mar. 29, 2016  (JP) ................................. 2016-066921

(51) Int. Cl.
*B60L 53/22*    (2019.01)
*B60K 6/448*    (2007.10)
(Continued)

(52) U.S. Cl.
CPC .............. *B60L 53/22* (2019.02); *B60K 6/448* (2013.01); *B60L 50/51* (2019.02); *B60L 53/20* (2019.02);
(Continued)

(58) Field of Classification Search
CPC .............. B60L 11/1812; B60L 11/1861; B60L 11/1868; B60K 6/448
See application file for complete search history.

(56) References Cited

U.S. PATENT DOCUMENTS

| 10,005,449 B2 * | 6/2018 | Takizawa .............. B60W 20/14 |
| 10,040,368 B2 * | 8/2018 | Oguma ................... B60L 11/08 |
| 2002/0097053 A1 * | 7/2002 | Tamagawa ............. B60K 6/485 |
| | | 324/382 |
| 2005/0284676 A1 * | 12/2005 | King ........................ B60L 7/06 |
| | | 180/65.22 |
| 2006/0127704 A1 * | 6/2006 | Raiser ................ B60L 11/1887 |
| | | 429/9 |

(Continued)

FOREIGN PATENT DOCUMENTS

| JP | 2010-273428 | 12/2010 |
| JP | 2014-187757 | 10/2014 |
| JP | 2015-070726 | 4/2015 |

OTHER PUBLICATIONS

Japanese Office Action for corresponding JP Application No. 2016-066921, dated Aug. 27, 2019 (w/ English machine translation).

*Primary Examiner* — Donald J Wallace
(74) *Attorney, Agent, or Firm* — Mori & Ward, LLP

(57) ABSTRACT

A power supply system includes a first energy storage, a second energy storage, a power transmission circuit, and circuitry. An electrical load is connected to the first energy storage and to the second energy storage via the power transmission circuit. The circuitry is configured to control the power transmission circuit such that the first energy storage charges the second energy storage and supplies electric power to the electrical load according to a demand of the electrical load when a charge rate in the second energy storage is lower than or equal to a first threshold. The circuitry is configured to control the power transmission circuit such that at least the first energy storage among the first energy storage and the second energy storage supplies electric power to the electrical load according to the demand when the charge rate is higher than the first threshold.

13 Claims, 18 Drawing Sheets

(51) Int. Cl.
*B60L 50/51* (2019.01)
*B60L 58/13* (2019.01)
*B60L 58/20* (2019.01)
*B60L 53/20* (2019.01)

(52) U.S. Cl.
CPC ............ *B60L 58/13* (2019.02); *B60L 58/20* (2019.02); *B60L 2210/30* (2013.01); *B60L 2240/12* (2013.01); *B60L 2240/421* (2013.01); *B60L 2240/441* (2013.01); *B60L 2240/486* (2013.01); *B60L 2240/507* (2013.01); *B60L 2240/54* (2013.01); *B60L 2240/545* (2013.01); *B60L 2240/547* (2013.01); *B60L 2240/549* (2013.01); *B60L 2250/26* (2013.01); *B60Y 2200/92* (2013.01); *Y02T 10/6243* (2013.01); *Y02T 10/642* (2013.01); *Y02T 10/7005* (2013.01); *Y02T 10/7044* (2013.01); *Y02T 10/7066* (2013.01); *Y02T 10/7072* (2013.01); *Y02T 90/127* (2013.01); *Y02T 90/14* (2013.01); *Y10S 903/93* (2013.01)

(56) References Cited

U.S. PATENT DOCUMENTS

| | | | | |
|---|---|---|---|---|
| 2009/0212626 | A1* | 8/2009 | Snyder | B60K 6/28 307/10.1 |
| 2010/0108009 | A1* | 5/2010 | Holz | B60K 6/48 123/179.3 |
| 2012/0235511 | A1* | 9/2012 | Watson | H01M 2/1072 307/109 |
| 2012/0319471 | A1* | 12/2012 | Miller | B60L 3/0046 307/9.1 |
| 2013/0264975 | A1* | 10/2013 | Kaita | B60L 11/1853 318/139 |
| 2015/0168259 | A1* | 6/2015 | Hofmann | G01M 15/044 73/118.02 |
| 2016/0039306 | A1* | 2/2016 | Okamura | H02J 7/345 701/22 |
| 2016/0046203 | A1* | 2/2016 | Okamura | B60L 3/0046 701/22 |
| 2017/0151886 | A1* | 6/2017 | Oguma | B60L 11/1868 |
| 2017/0253127 | A1* | 9/2017 | Ciaccio | B60L 1/00 |

\* cited by examiner

POWER SUPPLY SYSTEM, TRANSPORTATION APPARATUS, AND POWER TRANSMISSION METHOD

CROSS-REFERENCE TO RELATED APPLICATIONS

The present application claims priority under 35 U.S.C. § 119 to Japanese Patent Application No. 2016-066921, filed Mar. 29, 2016, entitled "Power Supply System, Transportation Apparatus, and Power Transmission Method." The contents of this application are incorporated herein by reference in their entirety.

BACKGROUND

1. Field

The present disclosure relates to a power supply system, a transportation apparatus, and a power transmission method.

2. Description of the Related Art

Power supply systems of this type, as disclosed in Japanese Unexamined Patent Application Publication Nos. 2014-187757 and 2015-70726, for example, are known in the related art.

Japanese Unexamined Patent Application Publication No. 2014-187757 proposes a system which is capable of supplying power to an electric motor for a vehicle by using two energy storage devices, namely, a high-capacity energy storage device (a battery) having a relatively high capacity and a high-power energy storage device (a capacitor) having a relatively high upper limit on power that can be output. In this system, power is exchanged, as appropriate, between the two energy storage devices so as to set the state of charge (SOC) of each energy storage device to be close to an SOC center that is set in accordance with the vehicle speed.

Japanese Unexamined Patent Application Publication No. 2015-70726 discloses a technique for a hybrid vehicle including two, high-capacity and high-power energy storage devices, for supplying power from only the high-capacity energy storage device when the required output for power is less than a threshold and supplying power from both energy storage devices when the required output for power is greater than the threshold.

SUMMARY

According to one aspect of the present invention, a power supply system includes a first energy storage, a second energy storage, a power transmission circuit, and circuitry. The first energy storage has a first power density and a first energy density. The second energy storage has a second power density higher than the first power density and a second energy density lower than the first energy density. An electrical load is connected to the first energy storage and to the second energy storage via the power transmission circuit. The circuitry is configured to control the power transmission circuit such that the first energy storage charges the second energy storage and supplies electric power to the electrical load according to a demand of the electrical load when a charge rate in the second energy storage is lower than or equal to a first threshold. The circuitry is configured to control the power transmission circuit such that at least the first energy storage among the first energy storage and the second energy storage supplies electric power to the electrical load according to the demand when the charge rate is higher than the first threshold.

According to another aspect of the present invention, a power transmission method for performing power transmission among an electrical load, a first energy storage, and a second energy storage in a power supply system, the power supply system including the first energy storage and the second energy storage, the first energy storage having a first power density and a first energy density, the second energy storage having a second power density higher than the first power density and a second energy density lower than the first energy density, the power transmission method includes charging the second energy storage by the first energy storage and supplying electric power to the electrical load according to a demand of the electrical load when a charge rate in the second energy storage is lower than or equal to a first threshold. The power transmission method includes supplying electric power from at least the first energy storage among the first energy storage and the second energy storage to the electrical load according to the demand when the charge rate is higher than the first threshold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
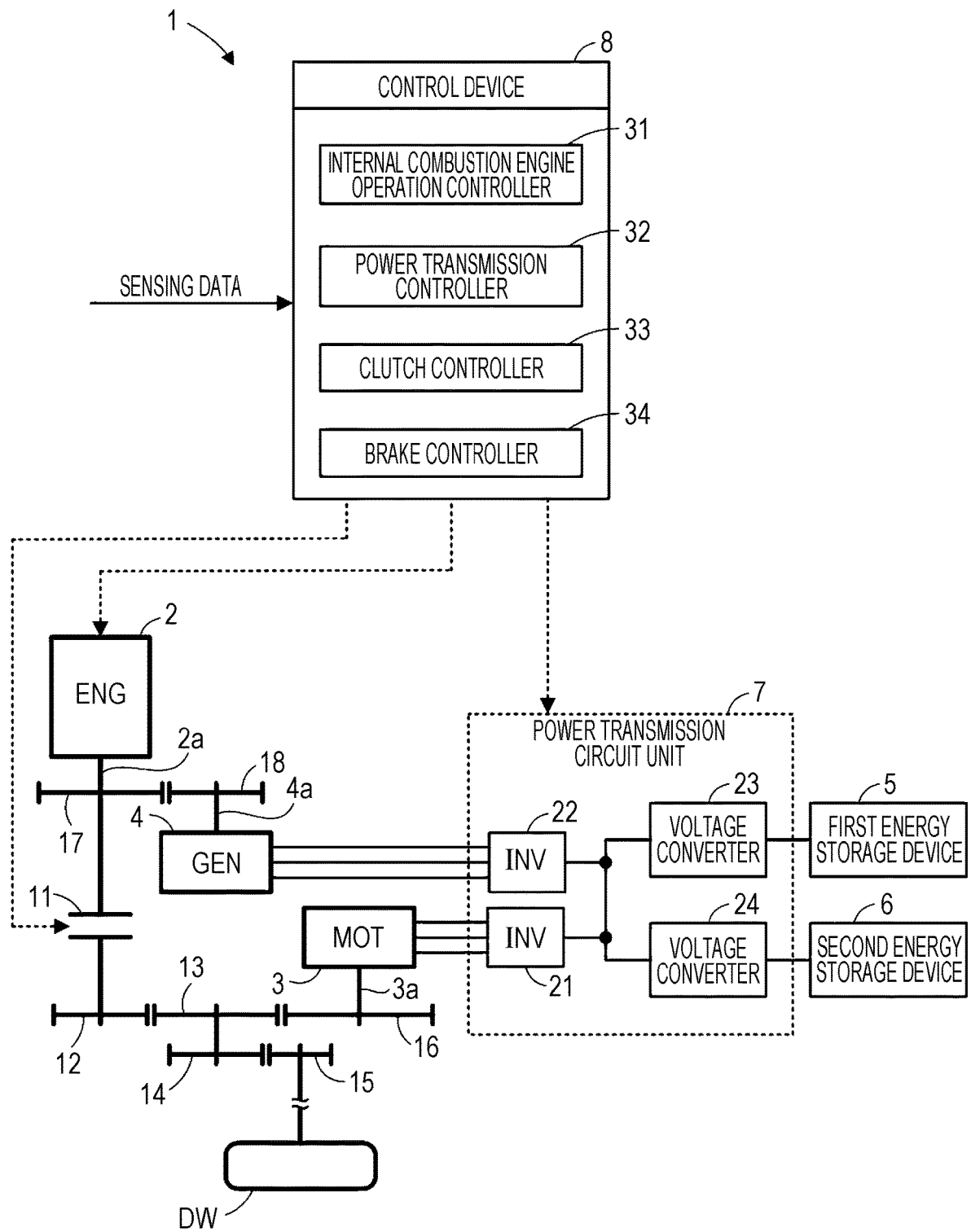
FIG. 1 illustrates an overall configuration of a motive power system according to an embodiment disclosed herein.

The embodiments will now be described with reference to the accompanying drawings, wherein like reference numerals designate corresponding or identical elements throughout the various drawings.

An embodiment of the present disclosure will be described hereinafter with reference to FIGS. 1 to 20. Referring to FIG. 1, a motive power system 1 according to this embodiment is a system mounted in a vehicle (more specifically, a hybrid vehicle) that is an example of a transportation apparatus. The motive power system 1 is an example of a power supply system according to the embodiments disclosed herein.

The motive power system 1 includes an internal combustion engine 2, an electric motor 3, an electric generator 4, a first energy storage device 5, a second energy storage device 6, a power transmission circuit unit 7, and a control device 8. The internal combustion engine 2 and the electric motor 3 are capable of generating motive power for driving a drive wheel DW, which serves as a driven load, to rotate. The first energy storage device 5 and the second energy storage device 6 serve as power supplies for the electric motor 3. The power transmission circuit unit 7 performs power transmission among the electric motor 3, the electric generator 4, the first energy storage device 5, and the second energy storage device 6. The control device 8 has a function of controlling the operation of the motive power system 1.

The internal combustion engine 2 transmits motive power generated by fuel combustion to the drive wheel DW via an appropriate powertrain to drive the drive wheel DW to rotate. The powertrain in the motive power system 1 in the illustrated example is configured to transmit motive power generated by the internal combustion engine 2 from an output shaft 2a of the internal combustion engine 2 to the drive wheel DW via a clutch 11 and a plurality of gears 12, 13, 14, and 15 in sequence. The clutch 11 is selectively operable between a connected state for making transmission of motive power feasible and a disconnected state for disconnecting transmission of motive power.

The electric motor 3 corresponds to an actuator according to the embodiments disclosed herein. The electric motor 3 transmits motive power generated through the power-running operation when supplied with power to the drive wheel DW via an appropriate powertrain to drive the drive wheel DW to rotate. The powertrain in the motive power system 1 in the illustrated example is configured to transmit motive power generated by the electric motor 3 from an output shaft 3a of the electric motor 3 to the drive wheel DW via the plurality of gears 16, 13, 14, and 15 in sequence.

The electric motor 3 is also capable of performing, in addition to the power-running operation, a regenerative operation for outputting regenerative power by using the kinetic energy of the vehicle which is transmitted from the drive wheel DW.

While a single drive wheel DW is illustrated in FIG. 1 as a representative example, a plurality of drive wheels DW are present and motive power is transmitted from the internal combustion engine 2 or the electric motor 3 to the plurality of drive wheels DW via a powertrain including a differential gear apparatus (not illustrated).

The electric generator 4 is an electric generator configured such that a rotating shaft 4a of the electric generator 4 is driven to rotate by using the motive power of the internal combustion engine 2, thereby being able to output generated power. The rotating shaft 4a of the electric generator 4 is connected to the output shaft 2a of the internal combustion engine 2 via an appropriate powertrain so as to rotate in association with the output shaft 2a of the internal combustion engine 2. The powertrain in the motive power system 1 in the illustrated example is configured to transmit motive power between the output shaft 2a and the rotating shaft 4a via two gears 17 and 18, for example.

In this embodiment, the electric generator 4 further has a function of an actuator (starter motor) for starting the internal combustion engine 2 in addition to the function of an electric generator. That is, power is supplied to the electric generator 4 to allow the electric generator 4 to operate as an electric motor. The motive power of the electric generator 4, which serves as an electric motor, is transmitted from the rotating shaft 4a to the output shaft 2a of the internal combustion engine 2, thereby driving the output shaft 2a to rotate.

For additional explanation, the powertrain between the internal combustion engine 2 or the electric motor 3 and the drive wheel DW and the powertrain between the internal combustion engine 2 and the electric generator 4 are not limited to those having the configuration exemplified in FIG. 1 and various configurations are available.

These powertrains may include, for example, components other than gears for transmission of motive power, for example, pulleys and belts or sprockets and chains, and may also include gearboxes.

The output shaft 3a of the electric motor 3 may be coupled coaxially directly to or integrated with any rotating shaft in the powertrain between the clutch 11 and the drive wheel DW, for example.

The powertrain between the electric motor 3 and the drive wheel DW or the powertrain between the internal combustion engine 2 and the electric generator 4 may include a clutch.

The motive power system 1 may include, besides the electric generator 4, an actuator for starting the internal combustion engine 2.

The first energy storage device 5 and the second energy storage device 6 are energy storage devices chargeable by an external power supply through a charging device (not illustrated) included in the vehicle. The first energy storage device 5 and the second energy storage device 6 have different characteristics.

Specifically, the first energy storage device 5 is an energy storage device having a higher energy density than the second energy storage device 6. The energy density is an amount of electrical energy storable per unit weight or unit volume. The first energy storage device 5 may be formed of, for example, a lithium-ion battery.

The second energy storage device 6 is an energy storage device having a higher power density than the first energy storage device 5. The power density is an amount of electricity that can be output per unit weight or unit volume (an amount of electrical energy per unit time or an amount of charge per unit time). The second energy storage device 6 may be formed of, for example, a lithium-ion battery, a nickel-hydrogen battery, or a capacitor.

The first energy storage device 5 with relatively high energy density is capable of storing a greater amount of electrical energy than the second energy storage device 6. The first energy storage device 5 has a characteristic in which steady discharge with less occurrence of changes in the output of the first energy storage device 5, rather than discharge with frequent occurrence of changes in the output of the first energy storage device 5, suppresses the progression of deterioration of the first energy storage device 5.

The first energy storage device 5 further has lower resistance to deterioration due to charging (in particular, charging at high rates) than the second energy storage device 6 (i.e., deterioration of the first energy storage device 5 caused by charging is more likely to progress than that of the second energy storage device 6).

The second energy storage device 6 with relatively high power density has lower internal resistance (impedance) than the first energy storage device 5, and is thus able to instantaneously output high power. The second energy storage device 6 has a characteristic in which the discharging or charging of the second energy storage device 6 with the charge rate being kept within an approximately middle range, rather than the discharging or charging of the second energy storage device 6 with the charge rate being biased toward the high-capacity side or the low-capacity side, suppresses the progression of deterioration of the second energy storage device 6. More specifically, the second energy storage device 6 has a characteristic in which the more the charge rate increases or decreases toward the high-capacity side or the low-capacity side with respect to the approximately middle range, the more likely the progression of deterioration of the second energy storage device 6 is to occur.

The charge rate of each of the energy storage devices 5 and 6 is the ratio of the remaining capacity to the full charge capacity. In the following, the charge rate is sometimes referred to as SOC (state of charge). In addition, the SOC of the first energy storage device 5 is sometimes referred to as the first SOC and the SOC of the second energy storage device 6 as the second SOC.

In this embodiment, the power transmission circuit unit 7 includes an inverter 21 connected to the electric motor 3, an inverter 22 connected to the electric generator 4, a voltage converter 23 connected to the first energy storage device 5, and a voltage converter 24 connected to the second energy storage device 6.

The inverters 21 and 22 are known circuits each having a switching element controlled by a duty signal to convert power from one of direct-current (DC) power and alternating-current (AC) power to the other.

The inverter 21 on the electric motor 3 side is capable of performing control to, during the power-running operation of the electric motor 3, convert DC power input from the voltage converter 23 or 24 into AC power and output the AC power to the electric motor 3, and is also capable of performing control to, during the regenerative operation of the electric motor 3, convert AC power (regenerative power) input from the electric motor 3 into DC power and output the DC power to the voltage converter 23 or 24.

The inverter 22 on the electric generator 4 side is capable of performing control to, during the power generation operation of the electric generator 4, convert AC power (generated power) input from the electric generator 4 into DC power and output the DC power to the voltage converter 23 or 24, and is also capable of performing control to, when the electric generator 4 is driven as an actuator for starting the internal combustion engine 2, convert DC power input from the voltage converter 23 or 24 into AC power and output the AC power to the electric generator 4.

The voltage converters 23 and 24 are known circuits (switching-type DC/DC converters) each having a switching element controlled by a duty signal to convert (boost or step down) the voltage of the DC power. Each of the voltage converters 23 and 24 is capable of variably controlling the voltage conversion ratio (boosting ratio or step-down ratio), and is also capable of performing bidirectional power transmission (power transmission during the discharging of the corresponding one of the energy storage devices 5 and 6 and power transmission during the charging of the corresponding one of the energy storage devices 5 and 6).

The control device 8 is constituted by an electronic circuit unit including a central processing unit (CPU), a random access memory (RAM), a read-only memory (ROM), an interface circuit, and so on. The control device 8 may be constituted by a plurality of electronic circuit units that are capable of communicating with each other.

The control device 8 includes, as functions implemented by a hardware configuration to be mounted therein or by a program (software configuration) to be installed therein, an internal combustion engine operation controller 31, a power transmission controller 32, a clutch controller 33, and a brake controller 34. The internal combustion engine operation controller 31 controls the operation of the internal combustion engine 2. The power transmission controller 32 controls the power transmission circuit unit 7 (and therefore controls the operation of the electric motor 3 and the electric generator 4). The clutch controller 33 controls switching between operating states of the clutch 11. The brake controller 34 controls a brake device (not illustrated) of the vehicle.

The control device 8 receives input of various sensing data as information necessary to implement the functions described above. The sensing data includes, for example, data indicating the amount of operation of the accelerator pedal of the vehicle, the amount of operation of the brake pedal, the vehicle speed, the rotational speed of the output shaft 2a of the internal combustion engine 2, the rotational speed of the output shaft 3a of the electric motor 3, the rotational speed of the rotating shaft 4a of the electric generator 4, and the respective detected values of the first SOC and the second SOC.

The control device 8 may include a function of an SOC detector that detects (estimates) the first SOC and the second SOC. In this case, the control device 8 receives input of sensing data for estimating the first SOC and the second SOC (for example, data indicating detected values of the voltage, current, temperature, and the like of the energy storage devices 5 and 6) instead of sensing data indicating the respective detected values of the first SOC and the second SOC.

A specific description will now be given of a control process for the control device 8.

Overview of Control Process for Control Device 8

First, a description will be given of an overview of a control process executed by the control device 8. The control process executed by the control device 8 is broadly categorized into two types: a control process for a charge-depleting (CD) mode and a control process for a charge-sustaining (CS) mode. The CD mode and the CS mode represent operation types of the motive power system 1 when the vehicle is traveling.

In this embodiment, the CD mode is a mode in which the motive power of the electric motor 3, out of the internal combustion engine 2 and the electric motor 3, is usable as motive power for driving the drive wheel DW (as motive power for propelling the vehicle) (in other words, a mode in which the vehicle is caused to travel as an electric vehicle).

In the CD mode in this embodiment, the stored energy of the first energy storage device 5, out of the first energy storage device 5 and the second energy storage device 6, is used as the primary power source energy for the electric motor 3 to perform the power-running operation of the electric motor 3.

In the CD mode in this embodiment, additionally, the internal combustion engine 2 remains at rest (the operation of the internal combustion engine 2 is disabled).

In this embodiment, in contrast, the CS mode is a mode in which the motive power of the internal combustion engine 2 and the motive power of the electric motor 3 are usable as motive power for driving the drive wheel DW. More specifically, the CS mode is a mode in which the motive power of the internal combustion engine 2 is usable as primary motive power for driving the drive wheel DW and the motive power of the electric motor 3 is usable as auxiliary motive power for driving the drive wheel DW.

The CS mode in this embodiment is divided into a first CS mode and a second CS mode. In the first CS mode, the power in the second energy storage device 6, out of the first energy storage device 5 and the second energy storage device 6, is used as primary power source energy for the power-running operation of the electric motor 3 and the power in the second energy storage device 6 is used to charge (or is transferred to) the first energy storage device 5, if necessary, to gradually restore the SOC of the first energy storage device 5 (i.e., the first SOC). In the second CS mode, the power in the first energy storage device 5, out of the first energy storage device 5 and the second energy storage device 6, is used as primary power source energy for the power-running operation of the electric motor 3 and the generated power of the electric generator 4 is used to charge the second energy storage device 6 to restore the SOC of the second energy storage device 6 (i.e., the second SOC).

The control process in the first CS mode and the control process in the second CS mode are alternately executed so as to place the total charge and discharge of the first energy storage device 5 and the second energy storage device 6 in balance as appropriate. As a result of repeating the control process in the first CS mode and the control process in the second CS mode or as a result of plug-in charging with an external electric power system, the SOC of the first energy storage device 5 is restored to some extent. Then, the mode of the control process is returned from the CS mode to the CD mode.

A pattern indicating how the respective stored energies of the first energy storage device 5 and the second energy storage device 6 are used in this embodiment will now be described with reference to FIG. 2.

Figure 2:
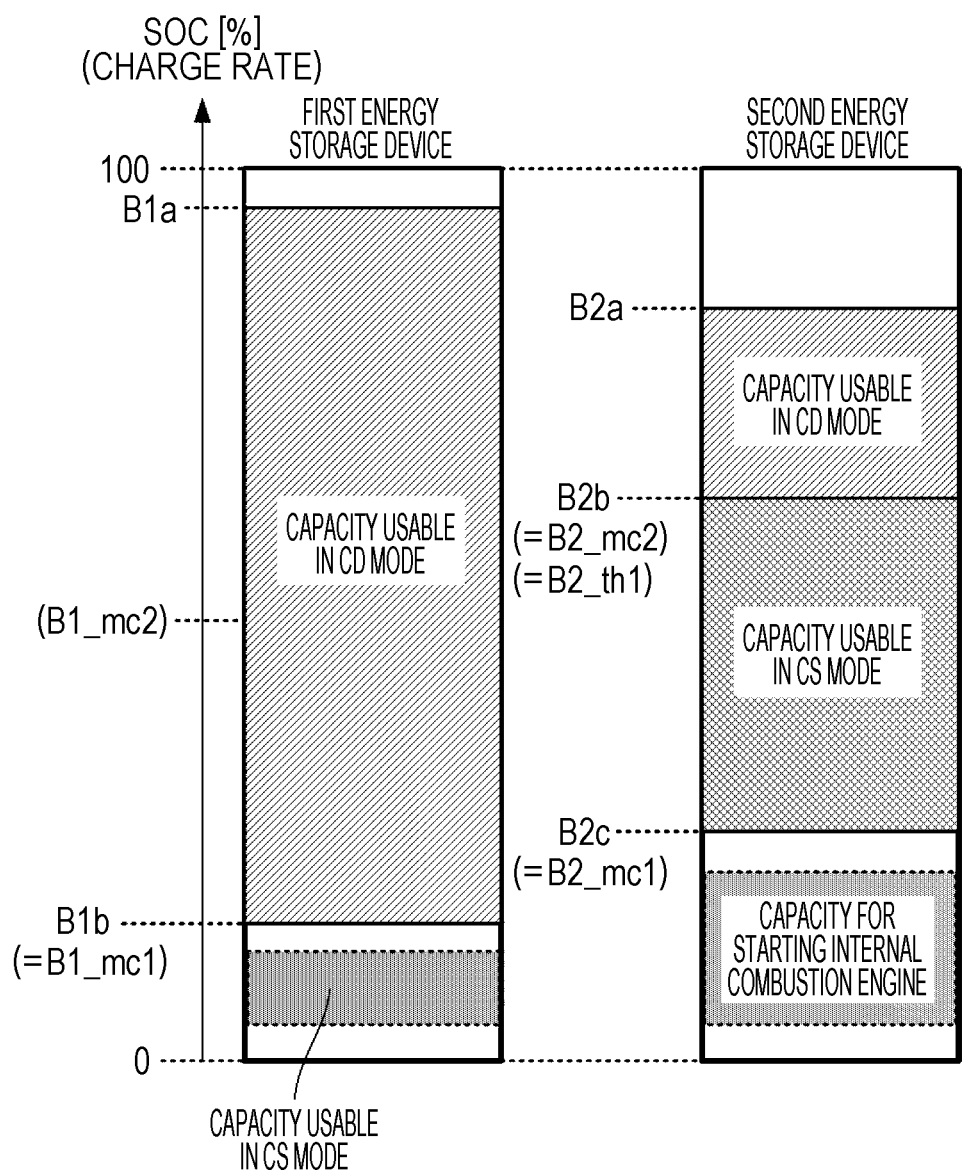
FIG. 2 conceptually illustrates how the respective capacities of a first energy storage device and a second energy storage device are allocated for use.
Figure 3:
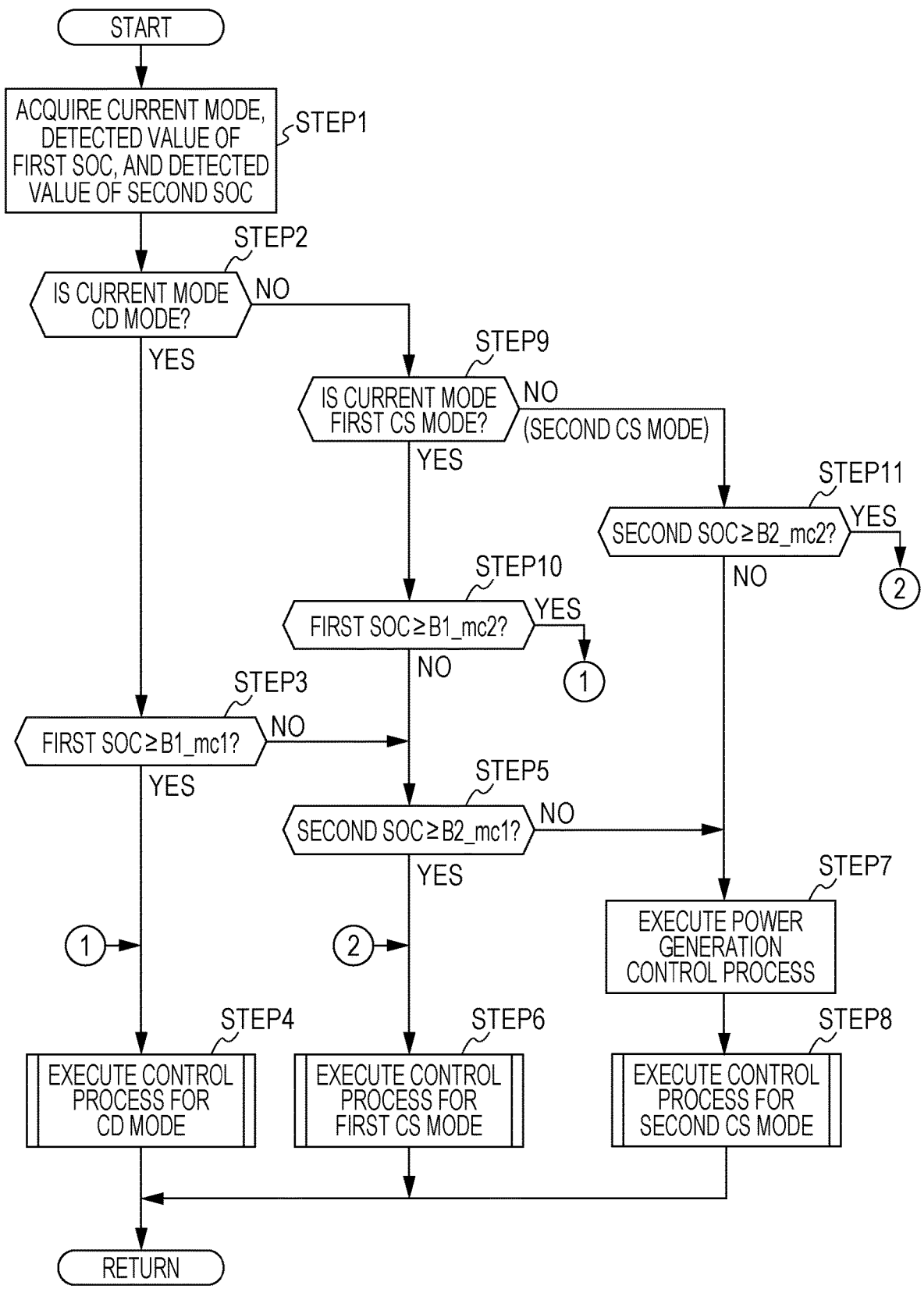
FIG. 3 is a flowchart illustrating a main routine process executed by a control device.

In this embodiment, as depicted in a left percentage bar chart in FIG. 2, a capacity (stored energy) of the range less than or equal to B1$a$ (%) out of the full charge capacity (100% SOC) of the first energy storage device 5 is allocated as a capacity usable for power supply to the electric motor 3. B1$a$ (%) is set to represent a charge rate slightly less than 100% with consideration given to a detection error of the first SOC, an error of charge control, or the like.

A capacity of the range of B1$a$ (%) to B1$b$ (%) is allocated as a capacity used for power supply to the electric motor 3 in the CD mode, and the range less than or equal to B1$b$ (%) is allocated as a range that includes a capacity usable for power supply to the electric motor 3 in the CS mode in an auxiliary manner. B1$b$ (%) is set to represent an SOC close to 0%.

The range less than or equal to B1$b$ (%) includes, in addition to the capacity usable for power supply to the electric motor 3 in the CS mode, margins that take into account a detection error of the first SOC or the like.

In this manner, a range that occupies a large proportion (the range of B1$a$ (%) to B1$b$ (%)) of the full charge capacity of the first energy storage device 5 is allocated as a capacity used for power supply to the electric motor 3 in the CD mode.

In this embodiment, as depicted in a right percentage bar chart in FIG. 2, a capacity of the range of B2$a$ (%) to B2$b$ (%) out of the full charge capacity (100% SOC) of the second energy storage device 6 is allocated as a dedicated capacity usable for power supply to the electric motor 3 in the CD mode, and a capacity of the range of B2$b$ (%) to B2$c$ (%) is allocated as a capacity usable for power supply to the electric motor 3 in the CS mode.

In this embodiment, part of the capacity of the range of B2$b$ (%) to B2$c$ (%) is also usable in the CD mode. Note that the capacity of the range of B2$b$ (%) to B2$c$ (%) is a capacity which is temporarily usable in the CD mode and which can basically be replenished, after part of the capacity has been used for power supply to the electric motor 3, by the first energy storage device 5 by the amount used.

To minimize the progression of deterioration of the second energy storage device 6, it is preferable to discharge or charge the second energy storage device 6 when the second SOC is an SOC near an intermediate value. Accordingly, B2$b$ (%) is set to approximately an intermediate SOC, B2$a$ (%) is set to a value larger than B2$b$ (%) to such an extent that B2$a$ (%) is not too close to 100%, and B2$c$ (%) is set to a value smaller than B2$b$ (%) to such an extent that B2$c$ (%) is not too close to 0%.

The range less than or equal to B2$c$ (%) is allocated as a range that includes power for starting the internal combustion engine 2 (power usable for power supply to the electric generator 4 serving as a starter actuator.

In this embodiment, when the internal combustion engine 2 is started, the second energy storage device 6 supplies power to the electric generator 4 and the power in the first energy storage device 5 is not used for power supply to the electric generator 4. This eliminates the need for the first energy storage device 5 to reserve power for starting the internal combustion engine 2.

This can increase the SOC range of the first energy storage device 5 which is allocated as a capacity range for power supply to the electric motor 3 in the CD mode. That is, in the CD mode in which fuel consumption of the internal combustion engine 2 does not occur or is suppressed, the drivable range of the vehicle is increased and the environmental performance of the motive power system 1 is improved. Additionally, instantaneous power supply to the starter actuator (in this embodiment, the electric generator 4), which is required to start the internal combustion engine 2, is undertaken by the second energy storage device 6. This can favorably suppress the progression of deterioration of the first energy storage device 5.

As illustrated in FIG. 2, in the CD mode, the SOC range (of B1$a$ (%) to B1$b$ (%)) of the first energy storage device 5 usable for power supply to the electric motor 3 is larger than the SOC range (of B2a (%) to B2b (%)) of the second energy storage device 6 usable for power supply to the electric motor 3.

Thus, in the CD mode, the power in the first energy storage device 5 can be primarily used to perform the power-running operation of the electric motor 3. In addition, the power in the second energy storage device 6 can also be used in an auxiliary manner, if necessary, to perform the power-running operation of the electric motor 3.

In particular, there is no need for the first energy storage device 5 to reserve power for starting the internal combustion engine 2. This makes it possible to maximize the SOC range (of B1a (%) to B1b (%)) usable for power supply to the electric motor 3 in the CD mode.

As a result, in the CD mode in which only the motive power of the electric motor 3 is used to propel the vehicle, the period during which power can be continuously supplied to the electric motor 3, and therefore the drivable range of the vehicle in the CD mode in which fuel consumption of the internal combustion engine 2 does not occur or is suppressed, can be maximized and the environmental performance of the vehicle can be improved.

In the CS mode, in contrast, as illustrated in FIG. 2, the SOC range (of B2b (%) to B2c (%)) of the second energy storage device 6 usable for power supply to the electric motor 3 is larger than the SOC range (part of the range less than or equal to Bib (%)) of the first energy storage device 5 usable for power supply to the electric motor 3.

Thus, in the CS mode, motive power that is supplementary to the motive power of the internal combustion engine 2 to drive the drive wheel DW (propel the vehicle) can be generated quickly (with high responsivity) primarily by supplying power from the high-power second energy storage device 6 to the electric motor 3.

Accordingly, when the motive power system 1 outputs a high driving force to the drive wheel DW, the electric motor 3 outputs auxiliary motive power by power supply from the second energy storage device 6. This enables not only suppression of excessive fuel consumption of the internal combustion engine 2 but also reduction in the displacement of the internal combustion engine 2.

In addition, since the second energy storage device 6 has a higher power density than the first energy storage device 5, the resistance of the second energy storage device 6 to charge or discharge for which high responsivity is required is superior to that of the first energy storage device 5. This can further suppress deterioration of the first energy storage device 5.

Main Routine Process

On the basis of the foregoing, a detailed description will be given of the control process for the control device 8. The control device 8 sequentially executes a main routine process illustrated in a flowchart in FIG. 3 in a predetermined control process cycle when the vehicle is started.

In STEP1, the control device 8 acquires the current mode of the control process, a detected value of the SOC of the first energy storage device 5 (i.e., the first SOC), and a detected value of the SOC of the second energy storage device 6 (i.e., the second SOC).

If the first energy storage device 5 is charged up to the fully-charged level (or up to the an SOC greater than or equal to a CS→CD switching threshold B1_mc2 described below) while the vehicle is at rest before the vehicle is started, the initial mode of the control process after the start of the vehicle is the CD mode. If the first energy storage device 5 is not charged while the vehicle is at rest before the vehicle is started, the initial mode of the control process after the start of the vehicle is the same mode as the mode set at the end of the previous driving operation of the vehicle.

Then, in STEP2, the control device 8 determines whether or not the current mode of the control process is the CD mode. If the determination result of STEP2 is affirmative, in STEP3, the control device 8 further determines whether or not the detected value of the first SOC is greater than or equal to a predetermined mode switching threshold B1_mc1. The mode switching threshold B1_mc1 is a threshold that defines whether or not to perform switching from the CD mode to the CS mode, and is hereinafter referred to as the CD→CS switching threshold B1_mc1. In this embodiment, the CD→CS switching threshold B1_mc1 is set to Bib (%) illustrated in FIG. 2.

If the determination result of STEP3 is affirmative, in STEP4, the control device 8 selects the CD mode as the mode of the control process and executes a control process for the CD mode (described in detail below). In this case, the control process for the CD mode is continuously executed.

If the determination result of STEP3 is negative, then, in STEP5, the control device 8 determines whether or not the detected value of the second SOC is greater than or equal to a mode switching threshold B2_mc1. The mode switching threshold B2_mc1 is a threshold that defines whether or not to perform switching from the first CS mode to the second CS mode, and is hereinafter referred to as the CS1→CS2 switching threshold B2_mc1. In this embodiment, the CS1→CS2 switching threshold B2_mc1 is set to B2c (%) illustrated in FIG. 2.

If the determination result of STEP5 is affirmative, in STEP6, the control device 8 selects the first CS mode as the mode of the control process and executes a control process for the first CS mode (described in detail below). Thus, the mode of the control process is switched from the CD mode to the first CS mode.

If the determination result of STEP5 is negative, in STEP7, the control device 8 executes a power generation control process for performing a power generation operation of the electric generator 4.

In the power generation control process, the control device 8 instructs the internal combustion engine operation controller 31 and the power transmission controller 32 to perform a power generation operation of the electric generator 4.

In this case, the internal combustion engine operation controller 31 controls the internal combustion engine 2 to output, from the internal combustion engine 2, motive power to which motive power for driving the electric generator 4 is added. The power transmission controller 32 controls the power transmission circuit unit 7 to preferentially charge the second energy storage device 6, out of the first energy storage device 5 and the second energy storage device 6, with generated power produced by the electric generator 4 which is supplied with the motive power of the internal combustion engine 2. Specifically, the power transmission controller 32 controls the voltage converter 24 and the inverter 22 of the power transmission circuit unit 7 to charge only the second energy storage device 6 with the generated power, except for the case where the detected value of the first SOC is smaller than a predetermined value (e.g., a threshold B1_th1 described below (see FIG. 11)).

If the detected value of the first SOC is smaller than the predetermined value and while power supply to the electric motor 3 is halted, the power transmission controller 32 controls the voltage converters 23 and 24 and the inverter 22 of the power transmission circuit unit 7 to charge both the first energy storage device 5 and the second energy storage device 6 with the generated power. In this case, the amount of generated power used to charge the first energy storage device 5 is limited to an amount of charging power at low rates (low speeds) to suppress the progression of deterioration of the first energy storage device 5.

Thus, the second energy storage device 6 is preferentially charged with the generated power. If the charge rate of the first energy storage device 5 is low, the first energy storage device 5 is appropriately charged with part of the generated power at a low rate.

In this case, the internal combustion engine operation controller 31 controls the internal combustion engine 2 to output from the internal combustion engine 2 motive power to which motive power for driving the electric generator 4 is added. The power transmission controller 32 controls the voltage converter 24 and the inverter 22 of the power transmission circuit unit 7 so that only the second energy storage device 6, out of the first energy storage device 5 and the second energy storage device 6, is charged with generated power produced by the electric generator 4 by using the motive power of the internal combustion engine 2.

Accordingly, the power generation operation of the electric generator 4 is performed and the generated power is used to charge the second energy storage device 6.

Note that the internal combustion engine 2 is not always in operation and has not started its operation when the determination result of STEP5 is negative. In this case, the control device 8 instructs the internal combustion engine operation controller 31 and the power transmission controller 32 to perform a power generation operation of the electric generator 4 after the internal combustion engine 2 has been started.

In the process for starting the internal combustion engine 2, the power transmission circuit unit 7 controls the voltage converter 24 on the second energy storage device 6 side and the inverter 22 on the electric generator 4 side to supply power from the second energy storage device 6 to the electric generator 4 (and to therefore cause the electric generator 4 to operate as a starter motor). This allows the output shaft 2a of the internal combustion engine 2 to be driven to rotate by the motive power of the electric generator 4 serving as a starter actuator (starter motor). In this embodiment, therefore, the second energy storage device 6 supplies power to the electric generator 4 (starter motor) when the internal combustion engine 2 is started.

Since instantaneous power supply to the starter actuator (the electric generator 4), which is required to start the internal combustion engine 2, is undertaken by the second energy storage device 6, the progression of deterioration of the first energy storage device 5 can be favorably suppressed.

Then, the internal combustion engine operation controller 31 supplies fuel to the internal combustion engine 2 in synchronization with the rotation of the output shaft 2a of the internal combustion engine 2 to start the combustion operation of the internal combustion engine 2. Thereafter, the internal combustion engine operation controller 31 and the power transmission controller 32 execute the control process described above for performing a power generation operation of the electric generator 4, thereby starting the power generation operation of the electric generator 4 and the charging of the second energy storage device 6 with the generated power.

After the power generation control process in STEP7, in STEP8, the control device 8 selects the second CS mode as the mode of the control process and executes a control process for the second CS mode (described in detail below).

Thus, the mode of the control process is switched from the CD mode to the second CS mode.

For additional explanation, in the second CS mode, the charging of the second energy storage device 6 through the power generation operation of the electric generator 4 is interrupted during the regenerative operation of the electric motor 3. In this case, the inverter 22 of the power transmission circuit unit 7 is controlled so that the energization of the inverter 22 is interrupted. Note that charging of the second energy storage device 6 with the regenerative power of the electric motor 3 and charging of the second energy storage device 6 with the generated power of the electric generator 4 may be performed in parallel.

If the determination result of STEP2 is negative, then, in STEP9, the control device 8 determines whether or not the current mode of the control process is the first CS mode.

If the determination result of STEP9 is affirmative, in STEP10, the control device 8 further determines whether or not the detected value of the first SOC is greater than or equal to a predetermined mode switching threshold B1_mc2. The mode switching threshold B1_mc2 is a threshold that defines whether or not to perform switching from the CS mode to the CD mode, and is hereinafter referred to as the CS→CD switching threshold B1_mc2. In this embodiment, the CS→CD switching threshold B1_mc2 is set to a value higher than the mode switching threshold B1_mc1 in STEP3 to provide hysteresis for switching between the first CS mode and the second CS mode, and is set to, for example, a value between B1b (%) and B1a (%) illustrated in FIG. 2.

If the determination result of STEP10 is affirmative, in STEP4, the control device 8 selects the CD mode as the mode of the control process and executes the control process for the CD mode. Thus, the mode of the control process is switched from the CS mode (first CS mode) to the CD mode.

If the determination result of STEP10 is negative, the control device 8 executes the process from STEP5 described above. If the determination result of STEP5 is affirmative, the control process for the first CS mode is continuously executed. If the determination result of STEP5 is negative, the mode of the control process is switched from the first CS mode to the second CS mode.

If the determination result of STEP9 is negative, in STEP11, the control device 8 further determines whether or not the detected value of the second SOC is greater than or equal to a predetermined mode switching threshold B2_mc2. The mode switching threshold B2_mc2 is a threshold that defines whether or not to perform switching from the second CS mode to the first CS mode, and is hereinafter referred to as the CS2→CS1 switching threshold B2_mc2. In this embodiment, the CS2→CS1 switching threshold B2_mc2 is set to B2b (%) (>the CS1→CS2 switching threshold B2_mc1) illustrated in FIG. 2.

If the determination result of STEP11 is affirmative, in STEP6, the control device 8 selects the first CS mode as the mode of the control process and executes the control process for the first CS mode. Thus, the mode of the control process is switched from the second CS mode to the first CS mode.

If the determination result of STEP11 is negative, the control device 8 executes the process from STEP7 described above. In this case, through the processing of STEP7 and STEP8, the power generation operation of the electric generator 4 is continuously executed and the control process in the second CS mode is also continuously executed.

As described above, switching between the CD mode and the CS mode is based on the first SOC and switching between the first CS mode and the second CS mode is based on the second SOC.

Control Process for CD Mode

Next, the control process for the CD mode in STEP4 will be described in detail.

The control device 8 determines a required driving force (required propulsion force) or required braking force of the entire vehicle in accordance with the detected value of the amount of operation of the accelerator pedal of the vehicle, the detected value of the amount of operation of the brake pedal of the vehicle, the detected value of the vehicle speed, and so on, and also determines the respective target operating states of the internal combustion engine 2, the electric motor 3, the electric generator 4, the clutch 11, and the brake device.

In the CD mode, the control device 8 maintains the internal combustion engine 2 and the electric generator 4 at rest and also maintains the clutch 11 in the disconnected state.

In a situation where the required driving force of the entire vehicle is not zero (this situation is hereinafter referred to as the vehicle driving request state), the control device 8 determines a required output DM_dmd of the electric motor 3 so as to realize the required driving force by using the motive power of the electric motor 3.

Then, as described in detail below, the control device 8 causes the power transmission controller 32 to control the inverter 21 on the electric motor 3 side and the voltage converters 23 and 24 of the power transmission circuit unit 7 to supply power from either or both of the first energy storage device 5 and the second energy storage device 6 to the electric motor 3 in accordance with a pre-created map illustrated in FIG. 4 on the basis of the required output DM_dmd and the detected value of the SOC of the second energy storage device 6 (i.e., the second SOC).

Examples of the required output DM_dmd of the electric motor 3 may include a request value of the amount of electrical energy to be supplied to the electric motor 3 per unit time (in other words, a requested power value), a driving force to be output from the electric motor 3, and a request value of the amount of mechanical output energy per unit time, and a request value of the current which is to flow through the electric motor 3 to output motive power (an output torque) that can satisfy the required driving force of the vehicle from the electric motor 3.

In this embodiment, the request value of the amount of electrical energy to be supplied to the electric motor 3 per unit time is used as an example of the required output DM_dmd of the electric motor 3.

In a situation where the required braking force of the entire vehicle is not zero (this situation is hereinafter referred to as the vehicle braking request state), the control device 8 determines respective shares of the required braking force for the electric motor 3 and the brake device. In this case, the control device 8 determines the respective shares for the electric motor 3 and the brake device on the basis of the magnitude of the required braking force, the detected value of the second SOC, and so on so as to basically maximize the share of the required braking force for the electric motor 3.

Then, the control device 8 causes the brake controller 34 to control the brake device in accordance with the share of the required braking force for the brake device.

Further, the control device 8 determines a required amount of regeneration G_dmd of the electric motor 3 so that the share of the required braking force for the electric motor 3 is satisfied by a regenerative braking force generated through the regenerative operation of the electric motor 3.

Figure 9:
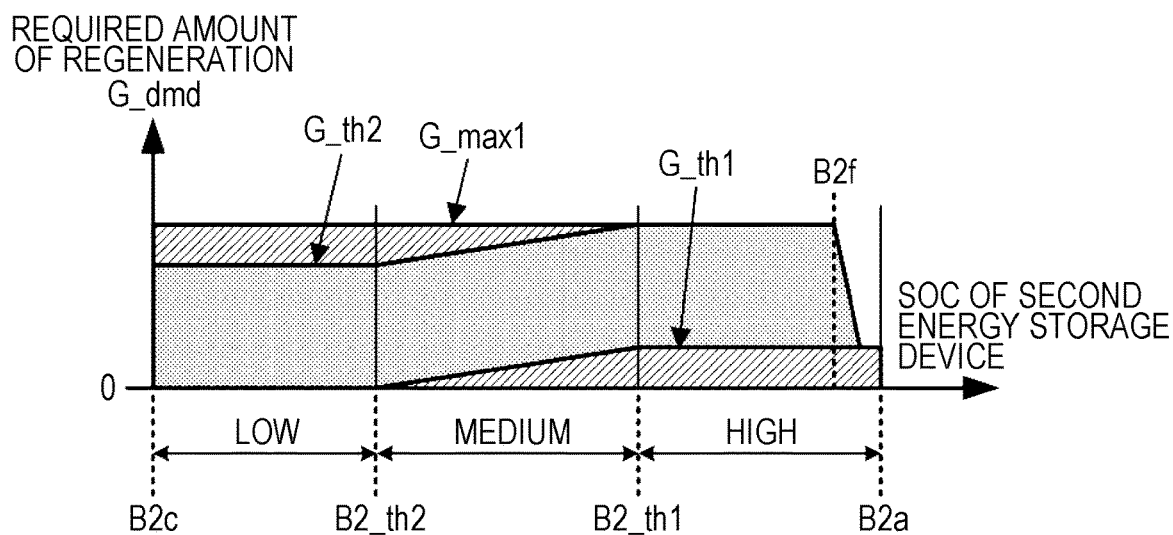
FIG. 9 illustrates a map used in a control process during regenerative operation of the electric motor in the CD mode.

Then, the control device 8 causes the power transmission controller 32 to control the inverter 21 on the electric motor 3 side and the voltage converters 23 and 24 of the power transmission circuit unit 7 to charge either or both of the first energy storage device 5 and the second energy storage device 6 with the regenerative power output from the electric motor 3 in accordance with a pre-created map illustrated in FIG. 9 on the basis of the required amount of regeneration G_dmd and the detected value of the SOC of the second energy storage device 6 (i.e., the second SOC). In this case, in this embodiment, the primary energy storage device to be charged with the regenerative power in the CD mode is the second energy storage device 6.

Examples of the required amount of regeneration G_dmd of the electric motor 3 may include, as the share of the required braking force of the entire vehicle that is taken on by the electric motor 3, a request value of the regenerative braking force generated by the electric motor 3 performing a regenerative operation, a request value of the regenerative power generated by the electric motor 3 performing a regenerative operation (the amount of electrical energy generated per unit time), and a request value of the current which is to flow through the electric motor 3.

In this embodiment, the request value of the regenerative power is used as an example of the required amount of regeneration G_dmd of the electric motor 3.

Control Process During Power-Running Operation in CD Mode

A control process executed by the power transmission controller 32 during the power-running operation of the electric motor 3 in the CD mode will be described in detail hereinafter with reference to FIGS. 4 to 8.

Figure 4:
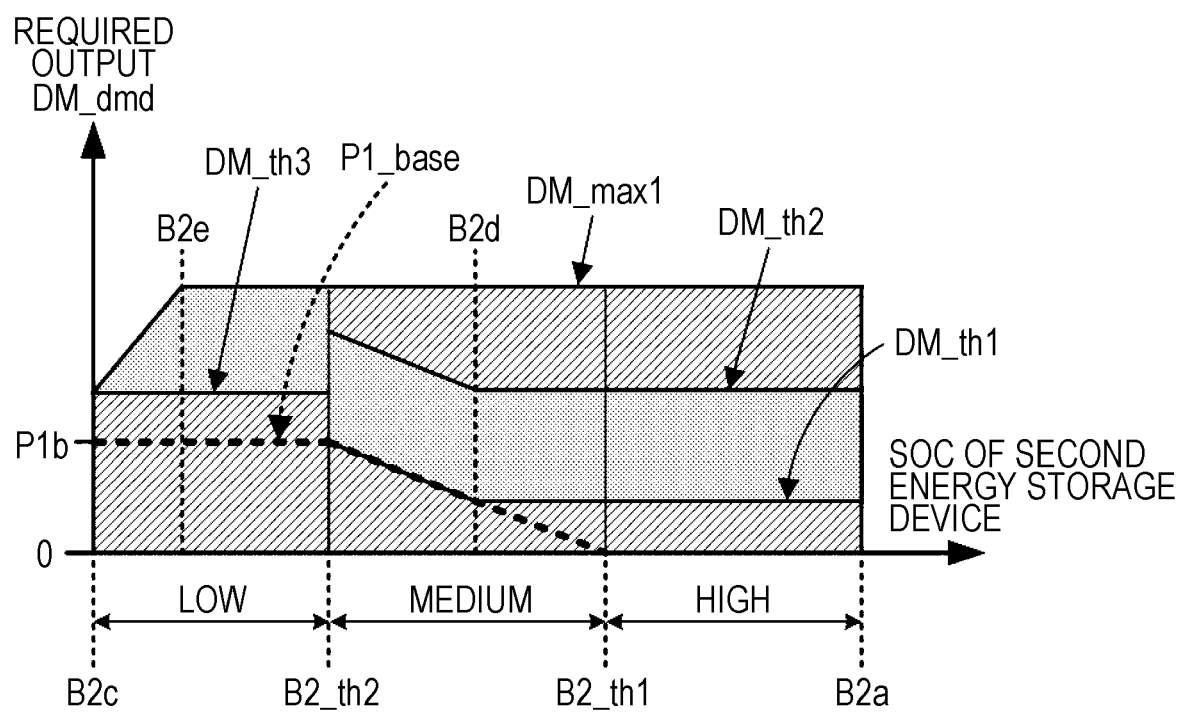
FIG. 4 illustrates a map used in a control process when power is supplied to an electric motor in a charge-depleting (CD) mode.

FIG. 4 illustrates a map depicting how the output demand for the amount of electricity to be supplied (the amount of power supplied) to the electric motor 3 is shared by the first energy storage device 5 and the second energy storage device 6 in accordance with the required output DM_dmd of the electric motor 3 and the second SOC.

In FIG. 4, diagonally hatched areas represent areas where all or part of the amount of power supplied to the electric motor 3 is taken on by the first energy storage device 5 and a shaded area represents an area where all or part of the amount of power supplied to the electric motor 3 is taken on by the second energy storage device 6.

More specifically, the lower diagonally hatched area represents an area where all the amount of power supplied to the electric motor 3 is taken on only by the first energy storage device 5 and the shaded area or the upper diagonally hatched area represents an area where the amount of power supplied to the electric motor 3 is taken on by both the first energy storage device 5 and the second energy storage device 6.

On the map illustrated in FIG. 4, DM_max1 is a maximum value of the required output DM_dmd in the CD mode. The maximum value DM_max1 is a constant value when the second SOC is an SOC greater than or equal to a predetermined value B2e. When the second SOC is smaller than the value B2e, the maximum value DM_max1 decreases in accordance with the decrease in the second SOC.

In the control process during the power-running operation of the electric motor 3 in the CD mode, as illustrated in FIG. 4, the shares for the respective outputs of the first energy storage device 5 and the second energy storage device 6 are identified for the cases where the value of the second SOC falls within a high-SOC area (high-remaining-capacity area), a medium-SOC area (medium-remaining-capacity area), and a low-SOC area (low-remaining-capacity area) in the usable area of the second energy storage device 6 (the range of B2*a* to B2*c* illustrated in FIG. 2). The high-SOC area is an area where SOC≥B2_th1 is satisfied. The medium-SOC area is an area where B2_th1>SOC≥B2_th2 is satisfied. The low-SOC area is an area where B2_th2>SOC is satisfied.

On the map illustrated in FIG. 4, the thresholds B2_th1 and B2_th2 by which the second SOC is separated are thresholds (fixed values) determined in advance for the CD mode. The thresholds B2_th1 and B2_th2 are set in advance experimentally, for example, so that the medium-SOC area whose range is determined by the thresholds B2_th1 and B2_th2 is an SOC area within which the actual value of the second SOC preferably falls to minimize the progression of deterioration of the second energy storage device 6. Accordingly, the medium-SOC area is an area within which the progression of deterioration of the second energy storage device 6 can be favorably suppressed when the second energy storage device 6 is charged or discharged with the actual value of the second SOC being kept within the medium-SOC area as much as possible.

In this embodiment, the control process in the CD mode is performed with the second SOC being kept within the medium-SOC as much as possible to suppress the progression of deterioration of the second energy storage device 6.

In this embodiment, the threshold B2_th1, which is the lower limit of the high-SOC area, matches B2*b* (%) illustrated in FIG. 2. Accordingly, within the capacity of the second energy storage device 6, a capacity (stored energy) in the range of the high-SOC area is a dedicated capacity usable in the CD mode.

Figure 5:
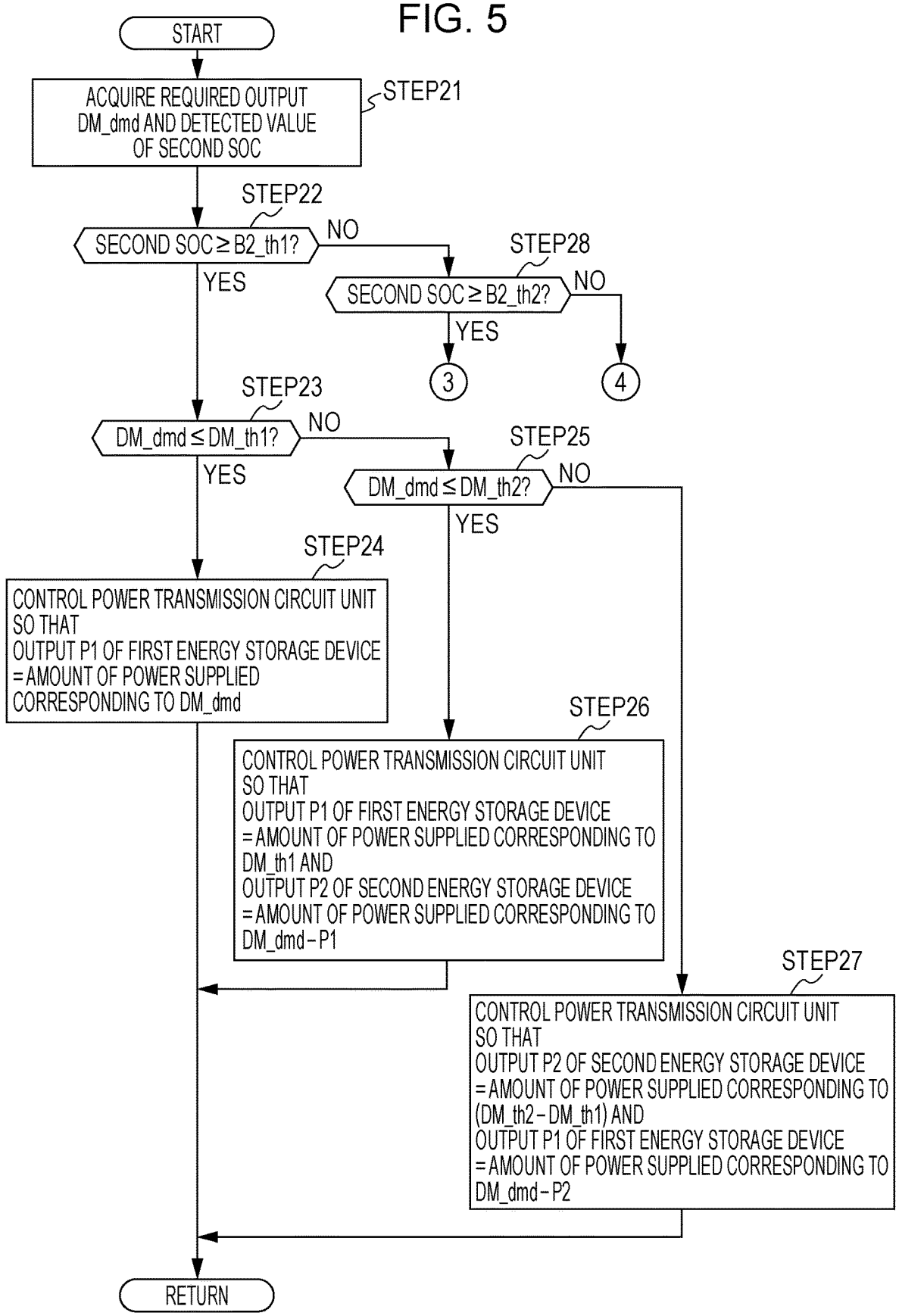
FIG. 5 is a flowchart illustrating the control process when power is supplied to the electric motor in the CD mode.
Figure 6:
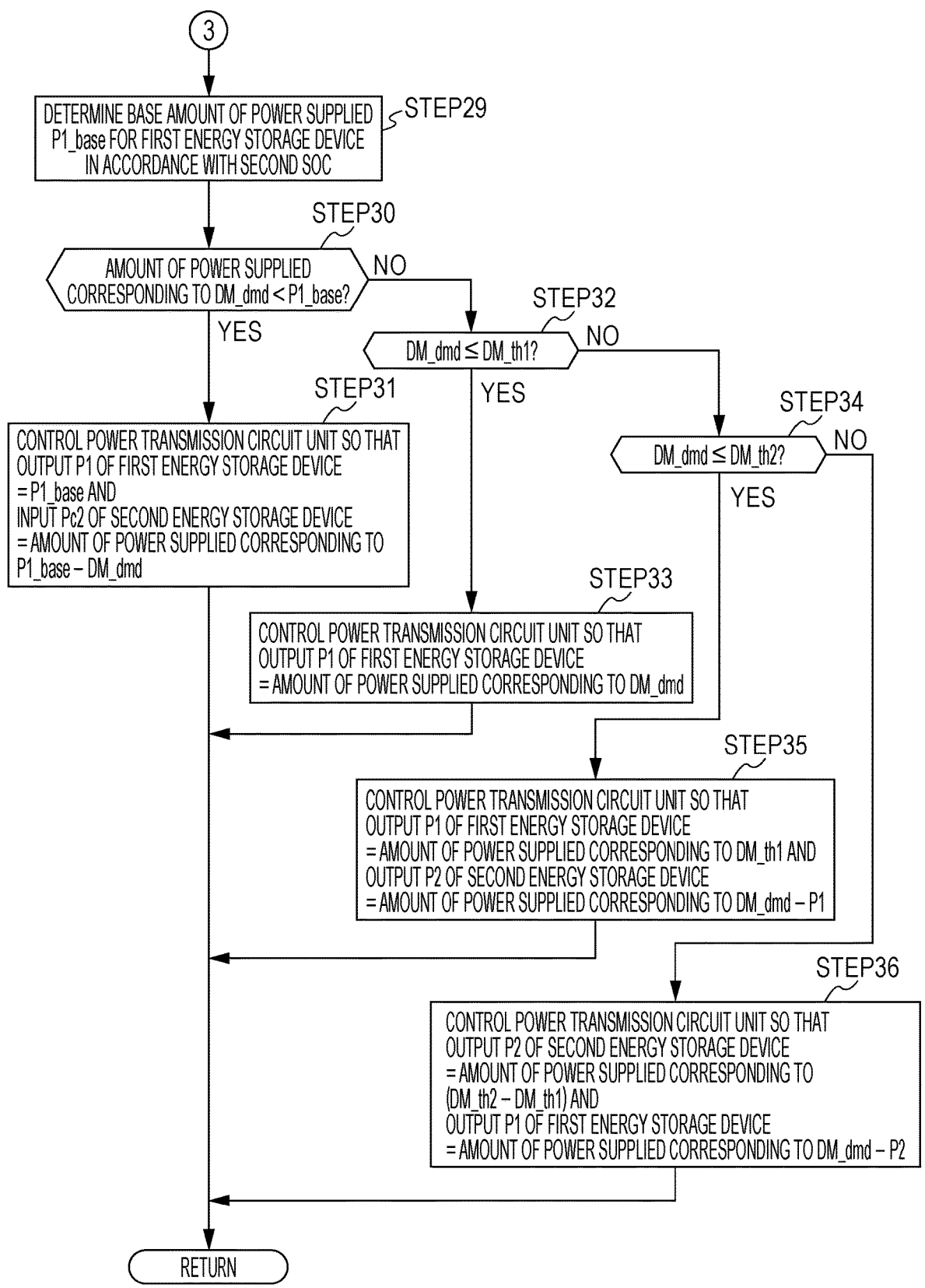
FIG. 6 is a flowchart illustrating the control process when power is supplied to the electric motor in the CD mode.
Figure 7:
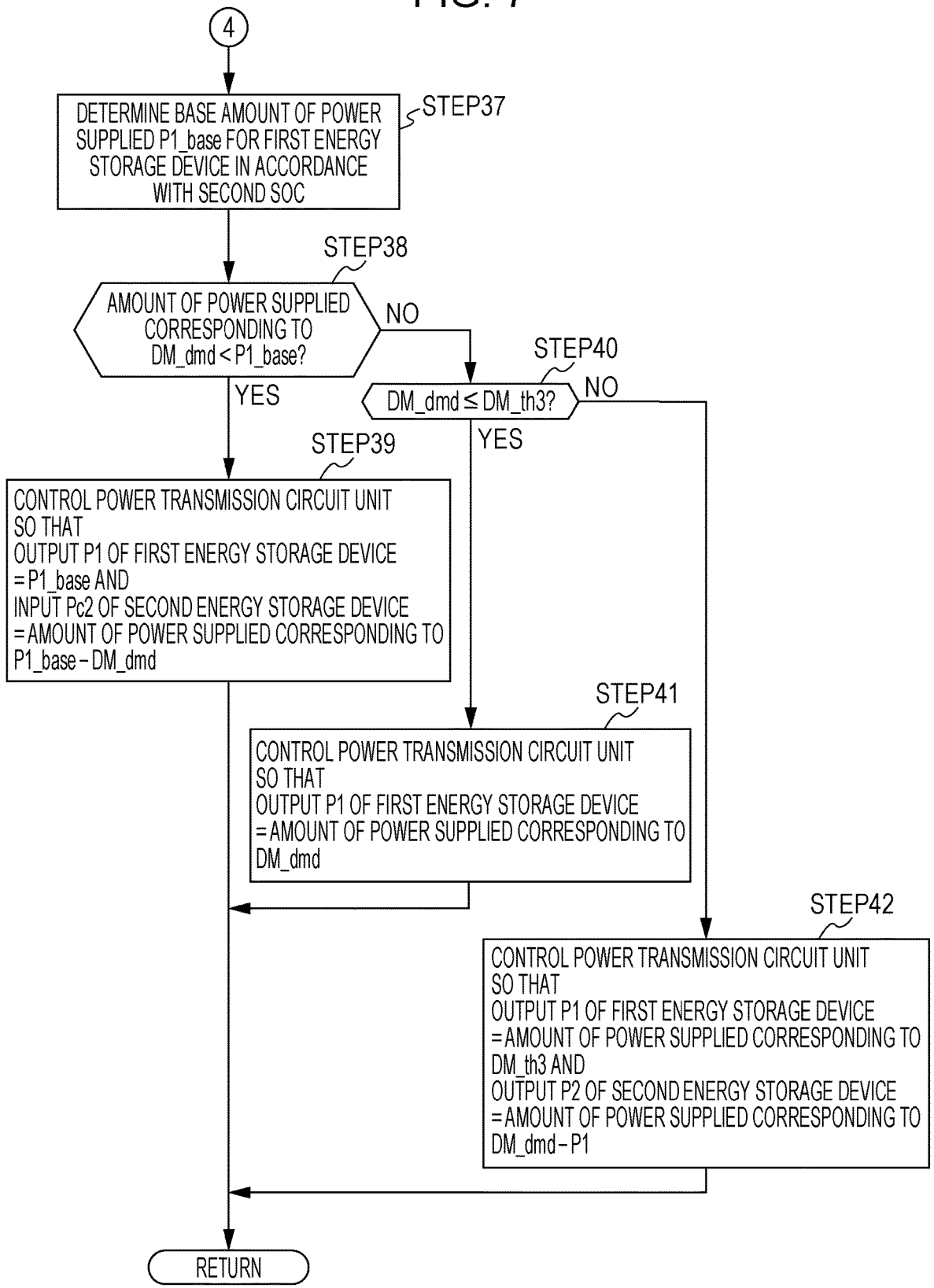
FIG. 7 is a flowchart illustrating the control process when power is supplied to the electric motor in the CD mode.

A control process for the power transmission controller 32 during the power-running operation of the electric motor 3 in the CD mode is sequentially executed in a predetermined control process cycle by using the map illustrated in FIG. 4 in accordance with a flowchart illustrated in FIGS. 5 to 7.

In STEP21, the power transmission controller 32 acquires the required output DM_dmd and a detected value of the second SOC. Then, in STEP22, the power transmission controller 32 determines whether or not the detected value of the second SOC acquired in STEP21 is greater than or equal to the threshold B2_th1, which is the upper limit of the medium-SOC area.

The determination result of STEP22 is affirmative in the situation where the detected value of the second SOC falls within the high-SOC area. In this case, then, in STEP23, the power transmission controller 32 determines whether or not the required output DM_dmd is less than or equal to a predetermined threshold DM_th1.

In this embodiment, the threshold DM_th1 is a threshold used for both the medium-SOC area and the high-SOC area. As illustrated in FIG. 4, the threshold DM_th1 is a predetermined constant value (fixed value) at values greater than or equal to a predetermined value B2*d* in the medium-SOC area. The constant value is a value determined so that the amount of power supplied corresponding to this value is sufficiently smaller than the allowable upper limit on the amount of power supplied to be output from the first energy storage device 5.

In a portion of the medium-SOC area smaller than the value B2*d*, the threshold DM_th1 is set so that the amount of power supplied corresponding to the threshold DM_th1 matches a base amount of power supplied P1_base described below (and consequently changes in accordance with the second SOC). In this case, the threshold DM_th1 increases as the second SOC decreases.

For additional explanation, the amount of power supplied corresponding to a certain threshold for the required output DM_dmd refers to the amount of electricity to be supplied to the electric motor 3 when the required output DM_dmd matches this threshold.

The determination result of STEP23 is affirmative for the lower diagonally hatched area in the high-SOC area illustrated in FIG. 4. In this case, in STEP24, the power transmission controller 32 controls the voltage converter 23 and the inverter 21 of the power transmission circuit unit 7 so that an output P1 of the first energy storage device 5 matches the amount of power supplied corresponding to the required output DM_dmd. In this case, the voltage converter 24 on the second energy storage device 6 side is controlled to block discharge from the second energy storage device 6.

The output P1 of the first energy storage device 5 is specifically an amount of electricity output (an amount of power discharged) from the first energy storage device 5, and an output P2 of the second energy storage device 6 (described below) is specifically an amount of electricity output (an amount of power discharged) from the second energy storage device 6. The amount of power supplied corresponding to the required output DM_dmd refers to the amount of electricity to be supplied to the electric motor 3 to realize the required output DM_dmd.

If the determination result of STEP23 is negative, then, in STEP25, the power transmission controller 32 determines whether or not the required output DM_dmd is less than or equal to a predetermined threshold DM_th2.

In this embodiment, similarly to the threshold DM_th1 in STEP23, the threshold DM_th2 is a threshold used for both the medium-SOC area and the high-SOC area. The threshold DM_th2 is set to a threshold larger than the threshold DM_th1 by a predetermined amount.

In this case, the threshold DM_th2 may be set so that, for example, the amount of power supplied which is equivalent to the difference between the threshold DM_th2 and the threshold DM_th1 (=DM_th2−DM_th1) is equal to the allowable upper limit on the amount of power supplied for the second energy storage device 6 in the CD mode or is equal to an amount of power supplied which is close to the allowable upper limit.

The determination result of STEP25 is affirmative for the shaded area in the high-SOC area illustrated in FIG. 4. In this case, in STEP26, the power transmission controller 32 controls the voltage converters 23 and 24 and the inverter 21 of the power transmission circuit unit 7 so that the output P1 of the first energy storage device 5 matches the amount of power supplied corresponding to the threshold DM_th1 and so that the output P2 of the second energy storage device 6 matches the amount of power supplied which is obtained by subtracting the output P1 of the first energy storage device 5 from the amount of power supplied corresponding to the required output DM_dmd.

On the other hand, the determination result of STEP25 is negative for the upper diagonally hatched area in the high-SOC area illustrated in FIG. 4. In this situation, in STEP27, the power transmission controller 32 controls the voltage converters 23 and 24 and the inverter 21 of the power transmission circuit unit 7 so that the output P2 of the second energy storage device 6 matches the amount of power supplied corresponding to the difference between the thresholds DM_th1 and DM_th2 (=DM_th2−DM_th1) and so that the output P1 of the first energy storage device 5 matches the amount of power supplied which is obtained by subtracting the output P2 of the second energy storage device 6 from the amount of power supplied corresponding to the required output DM_dmd.

If the determination result of STEP22 is negative, then, in STEP28, the power transmission controller 32 further determines whether or not the detected value of the second SOC is greater than or equal to the threshold B2_th2, which is the lower limit of the medium-SOC area.

The determination result of STEP28 is affirmative in the situation where the detected value of the second SOC falls within the medium-SOC area. In this case, then, in STEP29 illustrated in FIG. 6, the power transmission controller 32 determines the base amount of power supplied P1_base, which is a base value of the output P1 of the first energy storage device 5, in accordance with the detected value of the second SOC.

The base amount of power supplied P1_base is a lower limit on the amount of electricity that is output from the first energy storage device 5 regardless of the required output DM_dmd of the electric motor 3 when the detected value of the second SOC falls within the medium-SOC area or the low-SOC area. That is, in this embodiment, when the detected value of the second SOC falls within the medium-SOC area or the low-SOC area, the power transmission circuit unit 7 is controlled so that the base amount of power supplied P1_base or a larger amount of power supplied is output from the first energy storage device 5 regardless of the required output DM_dmd.

The base amount of power supplied P1_base is determined from the detected value of the second SOC on the basis of a pre-created map or a calculation formula so that the base amount of power supplied P1_base changes in accordance with the second SOC in a pattern indicated by a broken line illustrated in FIG. 4, for example. In this case, the base amount of power supplied P1_base is determined to successively increase from zero to a maximum value P1b within the medium-SOC area in accordance with the decrease in the second SOC and to be kept constant at the maximum value P1b within the low-SOC area. The maximum value P1b is a value larger than the amount of power supplied corresponding to the threshold DM_th1 when the second SOC is greater than or equal to the predetermined value B2d in the medium-SOC area.

After determining the base amount of power supplied P1_base in the way described above, then, in STEP30, the power transmission controller 32 determines whether or not the amount of power supplied corresponding to the required output DM_dmd is smaller than the base amount of power supplied P1_base.

The determination result of STEP30 is affirmative for an area below the broken line within the lower diagonally hatched area in the medium-SOC area illustrated in FIG. 4. In this situation, in STEP31, the power transmission controller 32 controls the voltage converters 23 and 24 and the inverter 21 of the power transmission circuit unit 7 so that the output P1 of the first energy storage device 5 matches the base amount of power supplied P1_base and so that an input Pc2 of the second energy storage device 6, that is, the amount of charging power, matches the amount of power supplied which is obtained by subtracting the amount of power supplied corresponding to the required output DM_dmd from the base amount of power supplied P1_base.

If the determination result of STEP30 is negative, in STEP32, the power transmission controller 32 further determines whether or not the required output DM_dmd is less than or equal to the threshold DM_th1.

The determination result of STEP32 is affirmative for an area obtained by removing the area below the broken line from the lower diagonally hatched area in the medium-SOC area illustrated in FIG. 4 (specifically, an area obtained by combining the area along the broken line and an area above the broken line).

In this situation, in STEP33, as in STEP24, the power transmission controller 32 controls the voltage converter 23 and the inverter 21 of the power transmission circuit unit 7 so that the output P1 of the first energy storage device 5 matches the amount of power supplied corresponding to the required output DM_dmd. In this case, the voltage converter 24 on the second energy storage device 6 side is controlled to block discharge from the second energy storage device 6.

If the determination result of STEP32 is negative, in STEP34, the power transmission controller 32 further determines whether or not the required output DM_dmd is less than or equal to the threshold DM_th2.

The determination result of STEP34 is affirmative for the shaded area in the medium-SOC area illustrated in FIG. 4. In this situation, in STEP35, as in STEP26, the power transmission controller 32 controls the voltage converters 23 and 24 and the inverter 21 of the power transmission circuit unit 7 so that the output P1 of the first energy storage device 5 matches the amount of power supplied corresponding to the threshold DM_th1 and so that the output P2 of the second energy storage device 6 matches the amount of power supplied which is obtained by subtracting the output P1 of the first energy storage device 5 from the amount of power supplied corresponding to the required output DM_dmd.

On the other hand, the determination result of STEP34 is negative for the upper diagonally hatched area in the medium-SOC area illustrated in FIG. 4. In this situation, in STEP36, as in STEP27, the power transmission controller 32 controls the voltage converters 23 and 24 and the inverter 21 of the power transmission circuit unit 7 so that the output P2 of the second energy storage device 6 matches the amount of power supplied corresponding to the difference between the thresholds DM_th1 and DM_th2 (=DM_th2−DM_th1) and so that the output P1 of the first energy storage device 5 matches the amount of power supplied which is obtained by subtracting the output P2 of the second energy storage device 6 from the amount of power supplied corresponding to the required output DM_dmd.

Then, the determination result of STEP28 is negative in the situation where the detected value of the second SOC falls within the low-SOC area. In this case, then, in STEP37 illustrated in FIG. 7, the power transmission controller 32 determines the base amount of power supplied P1_base by using the same or substantially the same process as that in STEP29. Then, in STEP38, the power transmission controller 32 further determines whether or not the amount of power supplied corresponding to the required output DM_dmd is smaller than the base amount of power supplied P1_base.

The determination result of STEP38 is affirmative for an area below the broken line within the lower diagonally hatched area in the low-SOC area illustrated in FIG. 4. In this situation, in STEP39, as in STEP31, the power transmission controller 32 controls the voltage converters 23 and 24 and the inverter 21 of the power transmission circuit unit 7 so that the output P1 of the first energy storage device 5 matches the base amount of power supplied P1_base and so that the input Pct of the second energy storage device 6, that is, the amount of charging power, matches the amount of power supplied which is obtained by subtracting the amount of power supplied corresponding to the required output DM_dmd from the base amount of power supplied P1_base.

If the determination result of STEP38 is negative, in STEP40, the power transmission controller 32 further determines whether or not the required output DM_dmd is less than or equal to a predetermined threshold DM_th3.

The determination result of STEP40 is affirmative for an area obtained by removing the area below the broken line from the diagonally hatched area in the low-SOC area illustrated in FIG. 4 (specifically, an area obtained by combining the area along the broken line and an area above the broken line).

In this situation, in STEP41, as in STEP24 or STEP33, the power transmission controller 32 controls the voltage converter 23 and the inverter 21 of the power transmission circuit unit 7 so that the output P1 of the first energy storage device 5 matches the amount of power supplied corresponding to the required output DM_dmd. In this case, the voltage converter 24 on the second energy storage device 6 side is controlled to block discharge from the second energy storage device 6.

On the other hand, the determination result of STEP40 is negative for the shaded area in the low-SOC area illustrated in FIG. 4. In this situation, in STEP42, the power transmission controller 32 controls the voltage converters 23 and 24 and the inverter 21 of the power transmission circuit unit 7 so that the output P1 of the first energy storage device 5 matches the amount of power supplied corresponding to the threshold DM_th3 and so that the output P2 of the second energy storage device 6 matches the amount of power supplied which is obtained by subtracting the output P1 of the first energy storage device 5 from the amount of power supplied corresponding to the required output DM_dmd.

The control process during the power-running operation of the electric motor 3 in the CD mode is executed in the way described above. In this control process, when the detected value of the second SOC falls within the high-SOC area, power is supplied from the second energy storage device 6 to the electric motor 3 in a range where the required output DM_dmd is less than or equal to the threshold DM_th2 (a comparatively commonly used range), except for the case where the required output DM_dmd is less than or equal to the comparatively small threshold DM_th1. In the high-SOC area, furthermore, the second energy storage device 6 is not charged with power supplied by the first energy storage device 5.

This can make the second SOC close to the medium-SOC area where the progression of deterioration of the second energy storage device 6 is favorably suppressed.

When the detected value of the second SOC falls within the medium-SOC area or the low-SOC area, if the amount of power supplied corresponding to the required output DM_dmd is less than or equal to the base amount of power supplied P1_base, the output P1 of the first energy storage device 5 is retained at the base amount of power supplied P1_base, which is set in accordance with the detected value of the second SOC.

If the amount of power supplied corresponding to the required output DM_dmd is smaller than the base amount of power supplied P1_base, the amount of power supplied corresponding to the required output DM_dmd, which is a portion of the base amount of power supplied P1_base, is supplied from only the first energy storage device 5 to the electric motor 3 and, also, the second energy storage device 6 is charged with the amount of power supplied which is obtained by subtracting the amount of power supplied corresponding to the required output DM_dmd from the base amount of power supplied P1_base.

In addition, as the second SOC decreases, the range of the required output DM_dmd in which the second energy storage device 6 is charged with power supplied from the first energy storage device 5 is increased and the amount of charging power of the second energy storage device 6 is more likely to increase.

As a result, when the second SOC falls within the medium-SOC area or the low-SOC area, if power is supplied from the second energy storage device 6 to the electric motor 3, then, the second energy storage device 6 can be basically replenished by being charged with power supplied from the first energy storage device 5, as appropriate. This enables the second SOC to be maintained within the medium-SOC area as much as possible. Therefore, the progression of deterioration of the second energy storage device 6 can be minimized. In addition, a portion of the capacity of the second energy storage device 6 which is used in the CS mode, described below, can be saved as much as possible.

Furthermore, when the second energy storage device 6 is charged, the base amount of power supplied P1_base output from the first energy storage device 5 is set in accordance with the second SOC regardless of the required output DM_dmd. Thus, the output P2 or the input Pc2 of the second energy storage device 6 changes in response to a change in the required output DM_dmd, and the change in the output P1 of the first energy storage device 5 is less sensitive to the change in the required output DM_dmd.

In particular, the base amount of power supplied P1_base in the low-SOC area is a constant value (=P1b). This prevents the output P1 of the first energy storage device 5 from changing in accordance with the change in required driving force DT_dmd.

As a result, in the situation where the second energy storage device 6 is charged (when the amount of power supplied corresponding to the required output DM_dmd is less than the base amount of power supplied P1_base), the output P1 of the first energy storage device 5 is of high stability with less frequent changes. Therefore, the progression of deterioration of the first energy storage device 5 can be minimized.

In this embodiment, when the second SOC is greater than or equal to the predetermined value B2d, if the amount of power supplied corresponding to the required output DM_dmd is less than or equal to the threshold DM_th1, power is supplied from only the first energy storage device 5 to the electric motor 3. This can reduce the load on the second energy storage device 6 when the second SOC is greater than or equal to the predetermined value B2d, resulting in the total amount of heat generation of the first energy storage device 5 and the second energy storage device 6 being reduced.

Figure 8:
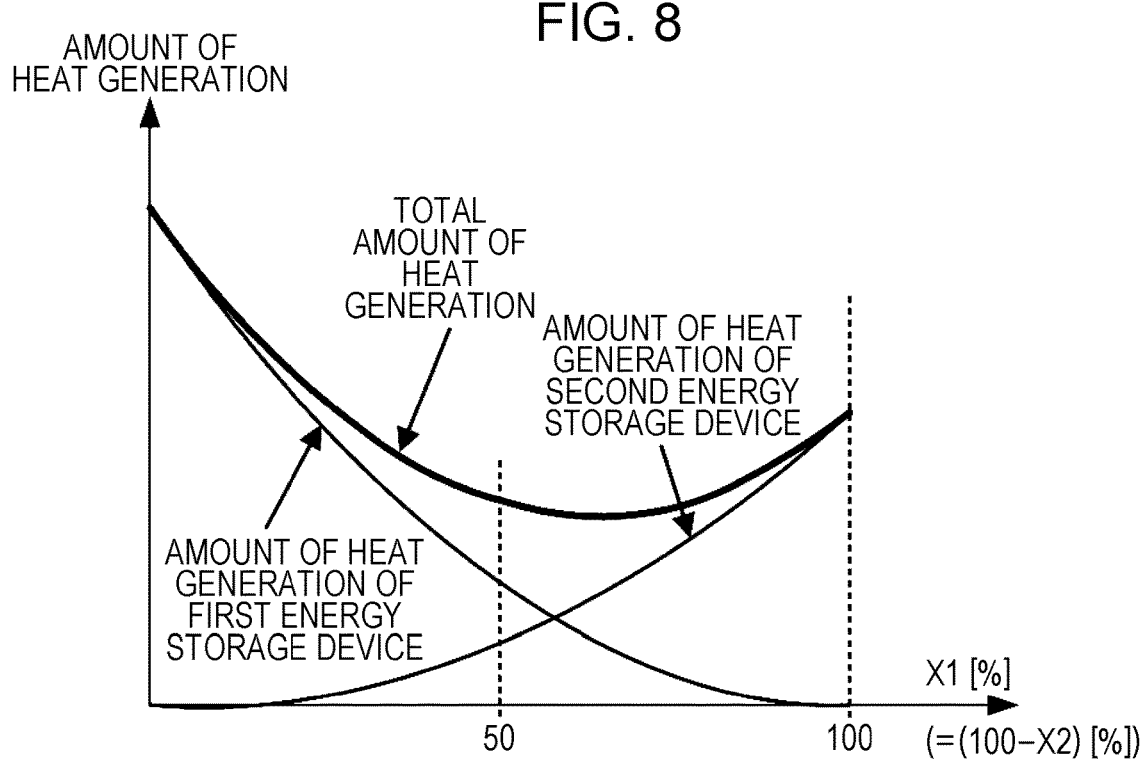
FIG. 8 is a graph exemplifying the relationship between respective percentage shares for the first energy storage device and the second energy storage device and amounts of heat generation.

FIG. 8 is a graph illustrating how the respective amounts of heat generation of the energy storage devices 5 and 6 and the total amount of heat generation of the energy storage devices 5 and 6 change in response to a change in percentage shares X1 and X2 of the constant required output DM_dmd for the first energy storage device 5 and the second energy storage device 6.

The percentage share X1 refers to the proportion of a share of the amount of power supplied corresponding to the constant required output DM_dmd that is taken on by the first energy storage device 5, and the percentage share X2 refers to the proportion of a share of the amount of power supplied corresponding to the constant required output DM_dmd that is taken on by the second energy storage device 6.

The second energy storage device 6 with relatively high power density has a lower impedance (internal resistance) than the first energy storage device 5 with relatively high energy density but includes fewer cells connected in parallel than the first energy storage device 5, and therefore has a lower output voltage than the first energy storage device 5. For this reason, when the percentage share X2 for the second energy storage device 6 is increased with respect to a certain constant value of the required output DM_dmd, the amount of heat generation of the second energy storage device 6 is more likely to increase than when the percentage share X1 for the first energy storage device 5 is increased (see two thin lines in the graph illustrated in FIG. 8).

As a result, as indicated by a thick line in the graph illustrated in FIG. 8, the total amount of heat generation of the first energy storage device 5 and the second energy storage device 6 becomes minimum when the percentage share X1 is greater than the percentage share X2.

In this embodiment, accordingly, when the second SOC is greater than or equal to the predetermined value B2d, if the amount of power supplied corresponding to the required output DM_dmd is less than or equal to the threshold DM_th1, power is supplied from only the first energy storage device 5 to the electric motor 3 to reduce the load on the second energy storage device 6 to such an extent that the load placed on the first energy storage device 5 does not become excessive.

This configuration can minimize the total amount of heat generation of the first energy storage device 5 and the second energy storage device 6 while preventing the second energy storage device 6 from generating excessive heat. In other words, the demand can be prevented from being concentrated in one of the first energy storage device 5 and the second energy storage device 6.

Control Process During Regenerative Operation in CD Mode

Next, a control process executed by the power transmission controller 32 during the regenerative operation of the electric motor 3 in the CD mode will be described in detail hereinafter with reference to FIGS. 9 and 10.

FIG. 9 is a map that defines how the regenerative power output by the electric motor 3 during the regenerative operation in the CD mode is shared in order to charge the first energy storage device 5 and the second energy storage device 6 in accordance with the required amount of regeneration G_dmd of the electric motor 3 and the second SOC.

In FIG. 9, diagonally hatched areas represent areas where all or part of the regenerative power generated by the electric motor 3 is used to charge the first energy storage device 5, and a shaded area represents an area where all or part of the regenerative power is used to charge the second energy storage device 6.

More specifically, the lower diagonally hatched area in the medium-SOC area and the high-SOC area of the second SOC represents an area where all of the regenerative power is used to charge only the first energy storage device 5. The shaded area in the medium-SOC area and the high-SOC area of the second SOC and the upper diagonally hatched area in the low-SOC area and the medium-SOC area represent areas where the regenerative power is used to charge both the first energy storage device 5 and the second energy storage device 6. The shaded area in the low-SOC area of the second SOC represents an area where all of the regenerative power is used to charge only the second energy storage device 6.

On the map illustrated in FIG. 9, G_max1 is a maximum value of the required amount of regeneration G_dmd in the CD mode. The maximum value G_max1 is a constant value when the second SOC is an SOC less than or equal to a predetermined value B2f in the high-SOC area. When the second SOC is larger than the value B2f, the maximum value G_max1 decreases as the second SOC increases.

Figure 10:
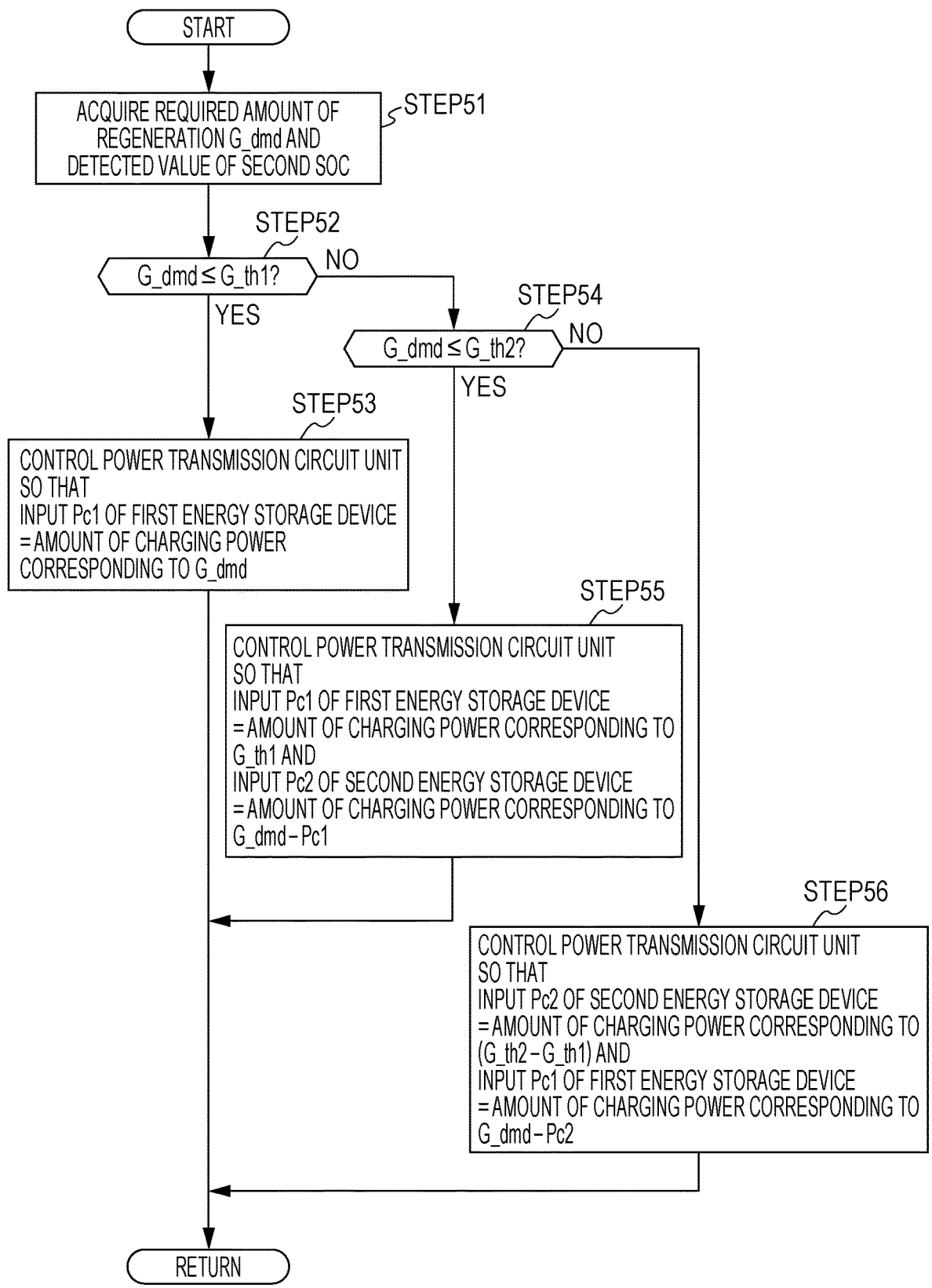
FIG. 10 is a flowchart illustrating a control process during regenerative operation of the electric motor in the CD mode.

The control process for the power transmission controller 32 during the regenerative operation of the electric motor 3 in the CD mode is sequentially executed in a predetermined control process cycle in accordance with a flowchart illustrated in FIG. 10 by using the map illustrated in FIG. 9.

In STEP51, the power transmission controller 32 acquires the required amount of regeneration G_dmd and a detected value of the second SOC.

Then, in STEP52, the power transmission controller 32 determines whether or not the required amount of regeneration G_dmd is less than or equal to a predetermined threshold G_th1.

In this embodiment, the threshold G_th1 is set in accordance with the second SOC. Specifically, as illustrated in the example in FIG. 9, when the second SOC falls within the high-SOC area, the threshold G_th1 is set to a predetermined constant value.

When the second SOC falls within the medium-SOC area, the threshold G_th1 is set to successively decrease from the constant value to zero in accordance with the decrease in the second SOC. In the low-SOC area of the second SOC, the threshold G_th1 is set to zero.

The amount of charging power corresponding to a maximum value of the threshold G_th1 (the constant value in the high-SOC area) is an upper limit on the amount of regenerative power used to charge the first energy storage device 5. The upper limit is determined to be a comparatively small value so as to allow the first energy storage device 5 to be charged at a low rate (low speed) to minimize the progression of deterioration of the first energy storage device 5.

For additional explanation, the amount of charging power corresponding to a certain threshold for the required amount of regeneration G_dmd refers to the amount of electricity representing the total regenerative power output from the electric motor 3 when the required amount of regeneration G_dmd matches this threshold.

The determination result of STEP52 is affirmative for the lower diagonally hatched area illustrated in FIG. 9. In this situation, in STEP53, the power transmission controller 32 controls the voltage converter 23 and the inverter 21 of the power transmission circuit unit 7 so that an input Pc1 of the first energy storage device 5 matches the amount of charging power corresponding to the required amount of regeneration G_dmd. In this case, the voltage converter 24 on the second energy storage device 6 side is controlled to block charging of the second energy storage device 6.

The input Pc1 of the first energy storage device 5 is specifically an amount of electricity used to charge the first energy storage device 5 (the amount of charging power), and the input Pc2 of the second energy storage device 6 (described below) is specifically an amount of electricity used to charge the second energy storage device 6 (an amount of charging power). The amount of charging power corresponding to the required amount of regeneration G_dmd refers to the amount of electricity representing the regenerative power output from the electric motor 3 when the regenerative operation of the electric motor 3 is performed in accordance with the required amount of regeneration G_dmd.

For additional explanation, when the detected value of the second SOC during the regenerative operation of the electric motor 3 falls within the low-SOC area, the threshold G_th1 is zero and thus no affirmative determination is made in STEP52. Thus, in this case, the processing of STEP53 is not executed.

If the determination result of STEP52 is negative, then, in STEP54, the power transmission controller 32 determines whether or not the required amount of regeneration G_dmd is less than or equal to a predetermined threshold G_th2.

In this embodiment, the threshold G_th2 is set in accordance with the second SOC in a way similar to that for the threshold G_th1 in STEP52 described above. Specifically, as illustrated in the example in FIG. 9, when the second SOC falls within the low-SOC area, the threshold G_th2 is set to a predetermined constant value. The constant value is set so that the amount of charging power corresponding to the difference between the threshold G_th2 and the maximum value G_max1 of the required amount of regeneration G_dmd (=G_max1−G_th2) matches the amount of charging power corresponding to the maximum value of the threshold G_th1 (the value of the threshold G_th1 in the high-SOC area), that is, the upper limit on the amount of charging power of the first energy storage device 5.

When the second SOC falls within the medium-SOC area, the threshold G_th2 is set to increase to the maximum value G_max1 in accordance with the increase in the second SOC in a pattern similar to the pattern in which the threshold G_th1 changes. In the high-SOC area of the second SOC, the threshold G_th1 is kept at the constant maximum value G_max1.

In the medium-SOC area, the thresholds G_th1 and G_th2 are set so that the sum of the amount of charging power corresponding to the difference between the maximum value G_max1 and the threshold G_th2 (=G_max1−G_th2) and the amount of charging power corresponding to the threshold G_th1 matches the upper limit on the amount of charging power of the first energy storage device 5.

The determination result of STEP54 is affirmative for the shaded area illustrated in FIG. 9. In this situation, in STEP55, the power transmission controller 32 controls the voltage converters 23 and 24 and the inverter 21 of the power transmission circuit unit 7 so that the input Pc1 of the first energy storage device 5 matches the amount of charging power corresponding to the threshold G_th1 and so that the input Pc2 of the second energy storage device 6 matches the amount of charging power obtained by subtracting the input Pc1 of the first energy storage device 5 from the amount of charging power corresponding to the required amount of regeneration G_dmd.

On the other hand, the determination result of STEP54 is negative for the upper diagonally hatched area in the low-SOC area or the medium-SOC area illustrated in FIG. 9. In this situation, in STEP56, the power transmission controller 32 controls the voltage converters 23 and 24 and the inverter 21 of the power transmission circuit unit 7 so that the input Pc2 of the second energy storage device 6 matches the amount of charging power corresponding to the difference between the thresholds G_th1 and G_th2 (=G_th2−G_th1) and so that the input Pct of the first energy storage device 5 matches the amount of charging power obtained by subtracting the input Pc2 of the second energy storage device 6 from the amount of charging power corresponding to the required amount of regeneration G_dmd.

For additional explanation, when the detected value of the second SOC during the regenerative operation of the electric motor 3 falls within the high-SOC area, the threshold G_th2 matches the maximum value G_max1 and thus no negative determination is made in STEP54. Thus, in this case, the processing of STEP56 is not executed.

The control process during the regenerative operation of the electric motor 3 in the CD mode is executed in the way described above. In this control process, when the detected value of the second SOC is larger than the threshold B2_th2, which is the lower limit of the medium-SOC area, the first energy storage device 5 is preferentially charged with regenerative power in the range where the required amount of regeneration G_dmd is less than or equal to the threshold G_th1.

Further, when the detected value of the second SOC is smaller than the threshold B2_th1, which is the upper limit of the medium-SOC area, the first energy storage device 5 is charged with regenerative power within a range where the required amount of regeneration G_dmd is larger than the threshold G_th2.

The amount of regenerative power used to charge the first energy storage device 5 is limited to a value less than or equal to a predetermined upper limit (the amount of charging power corresponding to the threshold G_th1 in the high-SOC area).

This configuration enables the first energy storage device 5 to be charged with regenerative power at a low rate. This can restore the SOC of the first energy storage device 5 while suppressing the progression of deterioration of the first energy storage device 5.

When the detected value of the second SOC is smaller than the threshold B2_th2, which is the lower limit of the medium-SOC area, the second energy storage device 6 is preferentially charged with regenerative power. When the detected value of the second SOC is larger than the threshold B2_th2, which is the lower limit of the medium-SOC area, the second energy storage device 6 is charged with regenerative power within a range where the required amount of regeneration G_dmd is larger than the threshold G_th1.

This configuration enables the second energy storage device 6 to be charged with regenerative power so that the SOC of the second energy storage device 6 can be kept within the medium-SOC area as much as possible. As a result, the progression of deterioration of the second energy storage device 6 can be minimized, and a portion of the capacity of the second energy storage device 6 which is used in the CS mode, described below, can be saved as much as possible.

The correspondences between this embodiment and the embodiments disclosed herein will now be briefly explained below. In this embodiment, the electric motor 3 corresponds to an electrical load in the embodiments disclosed herein. Further, within the control process executed by the power transmission controller 32 during the power-running operation of the electric motor 3 in the CD mode, the control process when the second SOC is in the medium-SOC area or in the low-SOC area and when the amount of power supplied corresponding to the required output DM_dmd is smaller than the base amount of power supplied P1_base (the control process in STEP31 or STEP 39) corresponds to a first control process in the embodiments disclosed herein.

Further, within the control process executed by the power transmission controller 32 during the power-running operation of the electric motor 3 in the CD mode, the control process when the second SOC is in the high-SOC area (the control process in STEP23 to STEP27) corresponds to a second control process in the embodiments disclosed herein.

Further, the thresholds B2_th1 and B2_th2 for the second SOC correspond to a first threshold and a second threshold in the embodiments disclosed herein, respectively, and the thresholds DM_th1 and DM_th2 for the required output DM_dmd correspond to an A-th threshold and a B-th threshold in the embodiments disclosed herein, respectively. The threshold DM_th1 also corresponds to a C-th threshold in the embodiments disclosed herein within the medium-SOC area of the second SOC.

Control Process for First CS Mode

Next, the control process for the first CS mode in STEP6 will be described in detail with reference to FIGS. 11 to 15.

The control device 8 determines a required driving force (required propulsion force) or required braking force of the entire vehicle in a way similar to that in the CD mode and also determines the respective target operating states of the internal combustion engine 2, the electric motor 3, the electric generator 4, the clutch 11, and the brake device.

In the first CS mode, the control device 8 determines the necessity of operation of the internal combustion engine 2 and the necessity of power generation operation of the electric generator 4, if necessary, in accordance with the required driving force or required braking force of the entire vehicle, the detected value of the second SOC, or the like, and controls the operation of the internal combustion engine 2 and the electric generator 4 in accordance with the determination result.

In this case, the start of the internal combustion engine 2 and the power generation operation of the electric generator 4 are performed in the way described above in connection with the processing of STEP7.

In the vehicle driving request state (in the state where the required driving force is not zero) during the operation of the internal combustion engine 2, the control device 8 determines the respective shares of the required driving force of the entire vehicle that are taken on by the electric motor 3 and the internal combustion engine 2 in accordance with the required driving force of the entire vehicle, the detected values of the first SOC and the second SOC, and so on.

In this case, the respective shares for the electric motor 3 and the internal combustion engine 2 are determined so that, basically, except for the case where the second SOC is comparatively high, all or a large portion of the required driving force is taken on by the internal combustion engine 2 and the electric motor 3 serves in an auxiliary role.

The control device 8 causes the internal combustion engine operation controller 31 to control the motive power (output torque) of the internal combustion engine 2 in accordance with the share of the required driving force for the internal combustion engine 2, and also causes the clutch controller 33 to control the operating state of the clutch 11. In a situation where the power generation operation of the electric generator 4 is performed, motive power necessary for the power generation operation of the electric generator 4 is added to the motive power of the internal combustion engine 2.

Further, the control device 8 determines the required output DM_dmd of the electric motor 3 so that the share of the required driving force for the electric motor 3 is satisfied by the motive power generated through the power-running operation of the electric motor 3.

Figure 11:
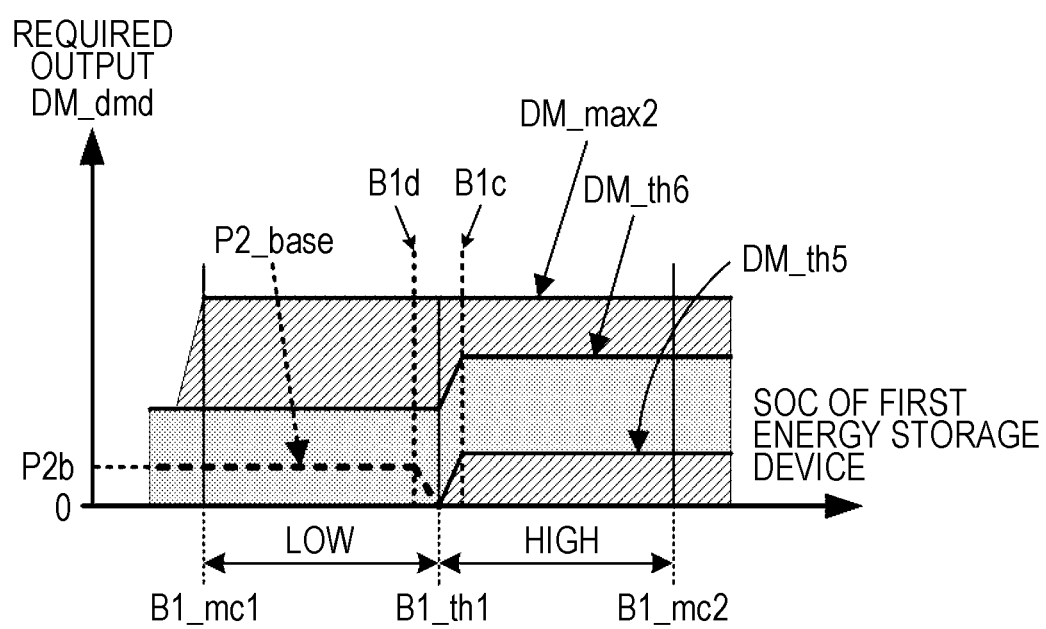
FIG. 11 illustrates a map used in a control process when power is supplied to the electric motor in a first charge-sustaining (CS) mode.

Then, the control device 8 causes the power transmission controller 32 to control the inverter 21 on the electric motor 3 side and the voltage converters 23 and 24 of the power transmission circuit unit 7 to supply power from either or both of the first energy storage device 5 and the second energy storage device 6 to the electric motor 3 in accordance with a pre-created map illustrated in FIG. 11 on the basis of the required output DM_dmd and the detected value of the SOC of the first energy storage device 5 (i.e., the first SOC).

In the first CS mode, even in a situation where the share of the required driving force for the electric motor 3 is zero (a situation where the power-running operation of the electric motor 3 is not performed), the control device 8 causes the power transmission controller 32 to control the voltage converters 23 and 24 of the power transmission circuit unit 7 so that, when the detected value of the first SOC is comparatively small, the first energy storage device 5 is charged with power supplied from the second energy storage device 6.

In the vehicle driving request state when the internal combustion engine 2 is not in operation, the control device 8 determines the required output DM_dmd of the electric motor 3 so that the required driving force of the entire vehicle is satisfied by the motive power generated through the power-running operation of the electric motor 3.

Then, similarly to when the internal combustion engine 2 is in operation, the control device 8 causes the power transmission controller 32 to control the inverter 21 on the electric motor 3 side and the voltage converters 23 and 24 of the power transmission circuit unit 7 in accordance with the map illustrated in FIG. 11 on the basis of the required output DM_dmd and the detected value of the first SOC.

In the vehicle braking request state (in the state where the required braking force is not zero), the control device 8 determines the respective shares of the required braking force of the entire vehicle for the electric motor 3 and the brake device. In this case, the control device 8 determines the respective shares for the electric motor 3 and the brake device on the basis of the magnitude of the required braking force, the detected value of the first SOC, and so on so as to basically maximize the share of the required braking force for the electric motor 3.

Then, the control device 8 causes the brake controller 34 to control the brake device in accordance with the share of the required braking force for the brake device.

Further, the control device 8 determines the required amount of regeneration G_dmd of the electric motor 3 so that the share of the required braking force for the electric motor 3 is satisfied by the regenerative braking force generated through the regenerative operation of the electric motor 3.

Figure 14:
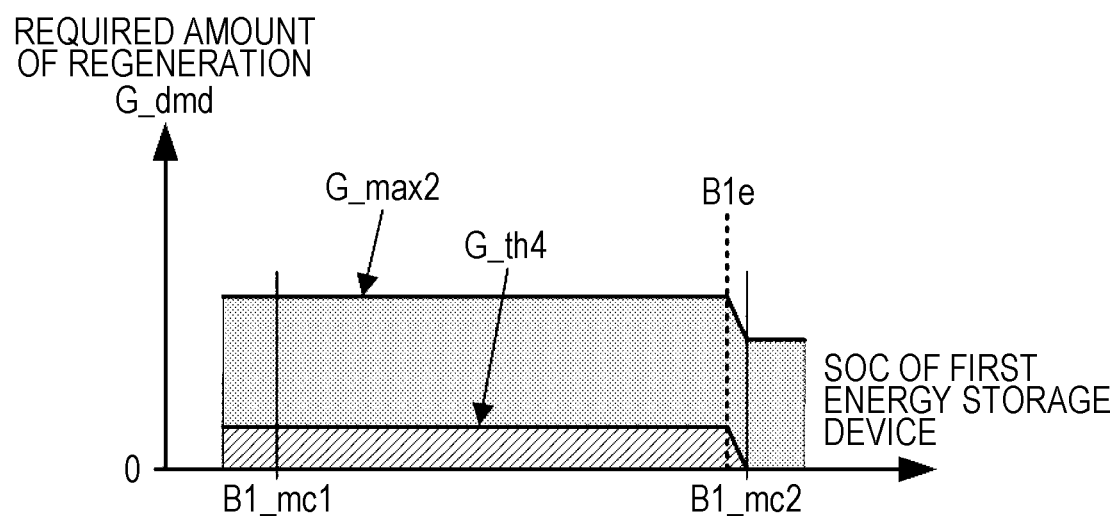
FIG. 14 illustrates a map used in a control process during regenerative operation of the electric motor in the first CS mode.

Then, the control device 8 causes the power transmission controller 32 to control the inverter 21 on the electric motor 3 side and the voltage converters 23 and 24 of the power transmission circuit unit 7 to charge either or both of the first energy storage device 5 and the second energy storage device 6 with the regenerative power output from the electric motor 3 in accordance with a pre-created map illustrated in FIG. 14 on the basis of the required amount of regeneration G_dmd and the detected value of the second SOC. In this embodiment, the primary energy storage device to be charged with the regenerative power in the first CS mode is the second energy storage device 6.

The power generation operation of the electric generator 4 is stopped during the regenerative operation of the electric motor 3 or during power supply from the second energy storage device 6 to the electric motor 3. Note that charging of the second energy storage device 6 with the regenerative power of the electric motor 3 and charging of the second energy storage device 6 with the generated power of the electric generator 4 may be performed in parallel.

Control Process During Power-Running Operation in First CS Mode

A control process executed by the power transmission controller 32 during the power-running operation of the electric motor 3 in the first CS mode will be described in detail hereinafter with reference to FIGS. 11 to 13.

FIG. 11 illustrates a map depicting how the output demand for the amount of electricity to be supplied (the amount of power supplied) to the electric motor 3 is shared by the first energy storage device 5 and the second energy storage device 6 in the first CS mode in accordance with the required output DM_dmd of the electric motor 3 and the first SOC.

In FIG. 11, diagonally hatched areas represent areas where all or part of the amount of power supplied to the electric motor 3 is taken on by the first energy storage device 5, and a shaded area represents an area where all or part of the amount of power supplied to the electric motor 3 is taken on by the second energy storage device 6.

More specifically, the lower diagonally hatched area represents an area where all the amount of power supplied to the electric motor 3 is taken on only by the first energy storage device 5, and a shaded area represents an area where the amount of power supplied to the electric motor 3 is taken on only by the second energy storage device 6 or the amount of power supplied to the electric motor 3 is taken on by both the first energy storage device 5 and the second energy storage device 6. The upper diagonally hatched area represents an area where the amount of power supplied to the electric motor 3 is taken on by both the first energy storage device 5 and the second energy storage device 6.

On the map illustrated in FIG. 11, DM_max2 is a maximum value of the required output DM_dmd in the first CS mode. The maximum value DM_max2 is a constant value.

In the control process during the power-running operation of the electric motor 3 in the first CS mode, as illustrated in FIG. 11, the shares for the respective outputs of the first energy storage device 5 and the second energy storage device 6 are identified for the cases where the value of the first SOC falls within a high-SOC area (high-remaining-capacity area) and a low-SOC area (low-remaining-capacity area) in the range between the CD→CS switching threshold B1_mc1 (see FIG. 2) and the CS→CD switching threshold B1_mc2 (see FIG. 2) described above. The high-SOC area is an area where SOC≥B1_th1 is satisfied, and the low-SOC area is an area where SOC<B1_th1 is satisfied. B1_th1 is a predetermined threshold (fixed value) between the CD→CS switching threshold B1_mc1 and the CS→CD switching threshold B1_mc2.

Figure 12:
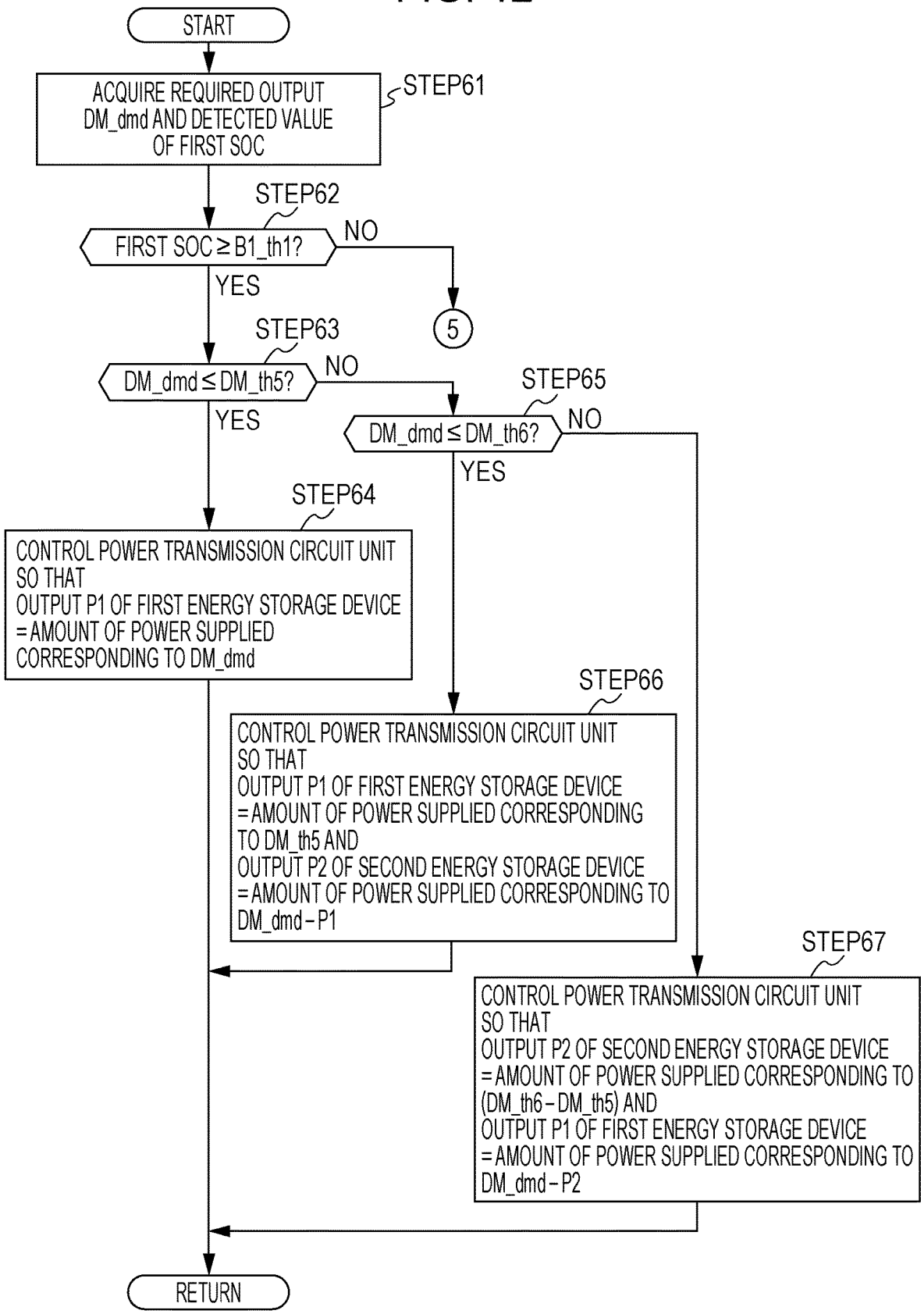
FIG. 12 is a flowchart illustrating a control process when power is supplied to the electric motor in the first CS mode.
Figure 13:
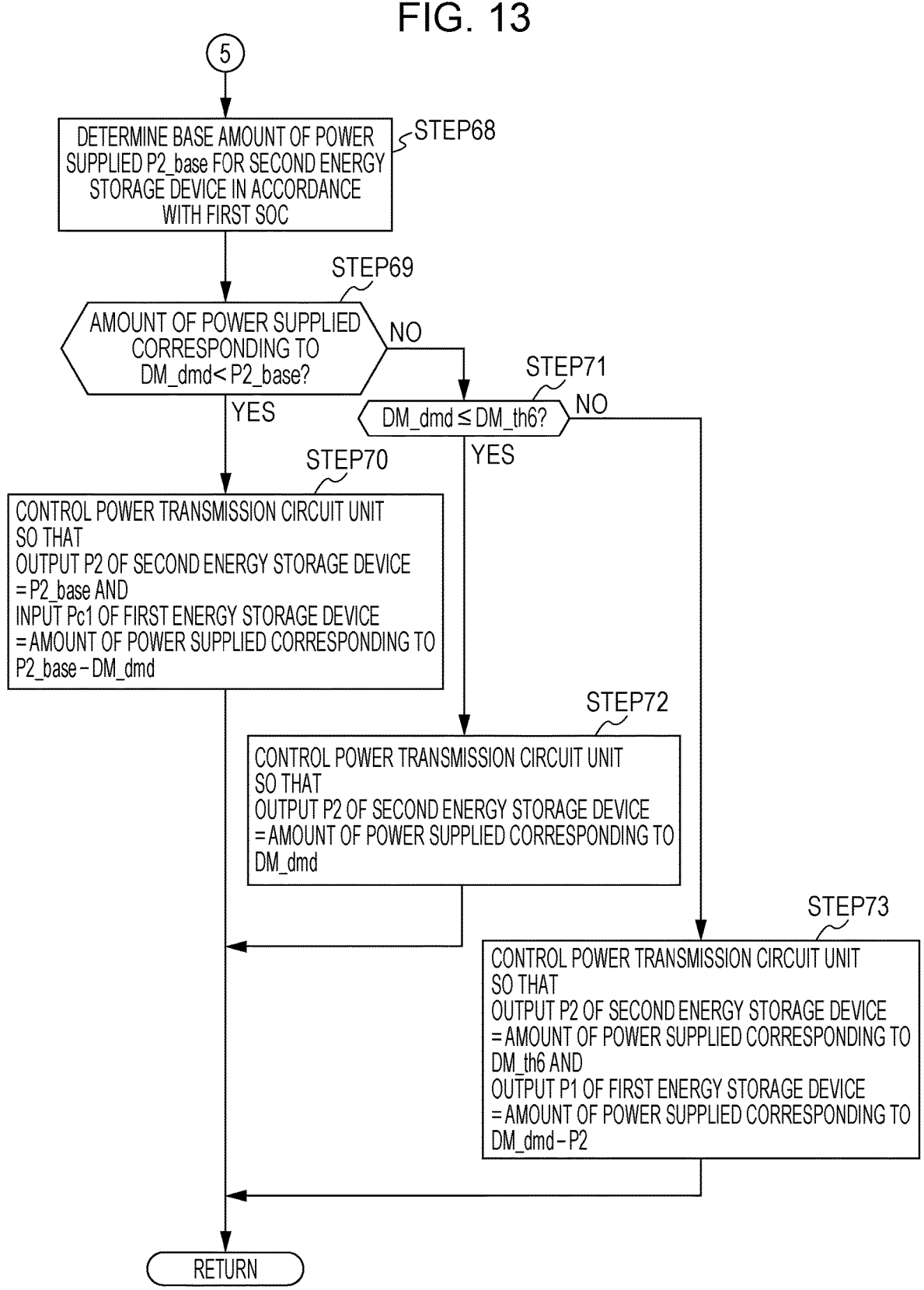
FIG. 13 is a flowchart illustrating a control process when power is supplied to the electric motor in the first CS mode.

The control process for the power transmission controller 32 during the power-running operation of the electric motor 3 in the first CS mode is sequentially executed in a predetermined control process cycle by using the map illustrated in FIG. 11 in accordance with a flowchart illustrated in FIGS. 12 and 13.

In STEP61, the power transmission controller 32 acquires the required output DM_dmd and a detected value of the first SOC. Then, in STEP62, the power transmission controller 32 determines whether or not the detected value of the first SOC acquired in STEP61 is greater than or equal to the threshold B1_th1.

The determination result of STEP62 is affirmative in the situation where the detected value of the first SOC falls within the high-SOC area. In this case, then, in STEP63, the power transmission controller 32 determines whether or not the required output DM_dmd is less than or equal to a predetermined threshold DM_th5.

As illustrated in FIG. 11, the threshold DM_th5 is a predetermined constant value (fixed value) when the first SOC is a value greater than or equal to a predetermined value B1c that is slightly larger than the threshold B1_th1. The constant value is a value sufficiently smaller than the allowable upper limit on the amount of power supplied to be output from the first energy storage device 5.

In the area less than the value B1c (the range of B1c to B1_th1), the threshold DM_th5 is set to decrease to zero in accordance with the decrease in the first SOC.

The determination result of STEP63 is affirmative for the lower diagonally hatched area in the high-SOC area illustrated in FIG. 11. In this case, in STEP64, the power transmission controller 32 controls the voltage converter 23 and the inverter 21 of the power transmission circuit unit 7 so that the output P1 of the first energy storage device 5 matches the amount of power supplied corresponding to the required output DM_dmd. In this case, the voltage converter 24 on the second energy storage device 6 side is controlled to block discharge from the second energy storage device 6.

If the determination result of STEP63 is negative, then, in STEP65, the power transmission controller 32 determines whether or not the required output DM_dmd is less than or equal to a predetermined threshold DM_th6.

In this embodiment, the threshold DM_th6 is a threshold used for both the high-SOC area and the low-SOC area of the second SOC. The threshold DM_th6 is set to a threshold that is larger than the threshold DM_th5 by a predetermined amount in the high-SOC area, and is set to a threshold that is larger than zero by the predetermined amount (i.e., the threshold is equal to the predetermined amount) in the low-SOC area.

In this case, the threshold DM_th6 can be set so that, for example, the amount of power supplied corresponding to the predetermined amount is equal to the allowable upper limit on the amount of power supplied for the second energy storage device 6 in the first CS mode or an amount of power supplied which is close to the allowable upper limit.

The required output DM_dmd, which is less than or equal to the threshold DM_th6, is in a commonly used range of the electric motor 3 in the first CS mode.

The determination result of STEP65 is affirmative for the shaded area in the high-SOC area illustrated in FIG. 11. In this case, in STEP66, the power transmission controller 32 controls the voltage converters 23 and 24 and the inverter 21 of the power transmission circuit unit 7 so that the output P1 of the first energy storage device 5 matches the amount of power supplied corresponding to the threshold DM_th5 and so that the output P2 of the second energy storage device 6 matches the amount of power supplied which is obtained by subtracting the output P1 of the first energy storage device 5 from the amount of power supplied corresponding to the required output DM_dmd.

On the other hand, the determination result of STEP65 is negative for the upper diagonally hatched area in the high-SOC area illustrated in FIG. 11. In this situation, in STEP67, the power transmission controller 32 controls the voltage converters 23 and 24 and the inverter 21 of the power transmission circuit unit 7 so that the output P2 of the second energy storage device 6 matches the amount of power supplied corresponding to the difference between the thresholds DM_th5 and DM_th6 (=DM_th6−DM_th5) and so that the output P1 of the first energy storage device 5 matches the amount of power supplied which is obtained by subtracting the output P2 of the second energy storage device 6 from the amount of power supplied corresponding to the required output DM_dmd.

The determination result of STEP62 is negative in the situation where the detected value of the first SOC falls within the low-SOC area. In this case, in STEP68 illustrated in FIG. 13, the power transmission controller 32 further determines a base amount of power supplied P2_base, which is a base value of the output P2 of the second energy storage device 6, in accordance with the detected value of the first SOC.

The base amount of power supplied P2_base is a lower limit on the amount of electricity that is output from the second energy storage device 6 regardless of the required output DM_dmd of the electric motor 3 when the detected value of the first SOC falls within the low-SOC area. That is, in this embodiment, when the detected value of the first SOC falls within the low-SOC area during the power-running operation of the electric motor 3, the power transmission circuit unit 7 is controlled so that the base amount of power supplied P2_base or a larger amount of power supplied is output from the second energy storage device 6 regardless of the required output DM_dmd.

In this embodiment, in the first CS mode, the power transmission circuit unit 7 is controlled so that also in a situation where the power-running operation of the electric motor 3 is not performed (in a situation where the required driving force of the entire vehicle is taken on only by the internal combustion engine 2), the base amount of power supplied P2_base is output from the second energy storage device 6 to charge the first energy storage device 5.

The base amount of power supplied P2_base is determined from the detected value of the first SOC on the basis of a pre-created map or a calculation formula so that the base amount of power supplied P2_base changes in accordance with the first SOC in a pattern indicated by a broken line illustrated in FIG. 11, for example. In this case, the base amount of power supplied P2_base is determined to successively increase from zero to a maximum value P2b in accordance with the decrease in the first SOC when the first SOC is an SOC in a range between the threshold B1_th1 and a predetermined value B1d that is slightly smaller than the threshold B1_th1, and is determined to be kept constant at the maximum value P2b in an area where the first SOC is less than or equal to the predetermined value Bid. The maximum value P2b is a value smaller than the amount of power supplied corresponding to the threshold DM_th6 for the required output DM_dmd in the low-SOC area of the first SOC. The maximum value P2b is set so that, even if a large portion of the maximum value P2b is used to charge the first energy storage device 5, the first energy storage device 5 can be charged at a low rate at which the progression of deterioration of the first energy storage device 5 can be suppressed.

After determining the base amount of power supplied P2_base in the way described above, then, in STEP69, the power transmission controller 32 determines whether or not the amount of power supplied corresponding to the required output DM_dmd is smaller than the base amount of power supplied P2_base.

The determination result of STEP69 is affirmative for an area below the broken line within the shaded area in the low-SOC area illustrated in FIG. 11. In this situation, in STEP70, the power transmission controller 32 controls the voltage converters 23 and 24 and the inverter 21 of the power transmission circuit unit 7 so that the output P2 of the second energy storage device 6 matches the base amount of power supplied P2_base and so that the input Pc1 (the amount of charging power) of the first energy storage device 5 matches the amount of power supplied which is obtained by subtracting the amount of power supplied corresponding to the required output DM_dmd from the base amount of power supplied P2_base.

If the determination result of STEP69 is negative, in STEP71, the power transmission controller 32 further determines whether or not the required output DM_dmd is less than or equal to the threshold DM_th6.

The determination result of STEP71 is affirmative for an area obtained by removing the area below the broken line from the shaded area in the low-SOC area illustrated in FIG. 11 (specifically, an area obtained by combining the area along the broken line and an area above the broken line).

In this situation, in STEP72, the power transmission controller 32 controls the voltage converter 24 and the inverter 21 of the power transmission circuit unit 7 so that the output P2 of the second energy storage device 6 matches the amount of power supplied corresponding to the required output DM_dmd. In this case, the voltage converter 23 on the first energy storage device 5 side is controlled to block discharge from the first energy storage device 5.

On the other hand, the determination result of STEP71 is negative for the upper diagonally hatched area in the low-SOC area illustrated in FIG. 11. In this situation, in STEP73, the power transmission controller 32 controls the voltage converters 23 and 24 and the inverter 21 of the power transmission circuit unit 7 so that the output P2 of the second energy storage device 6 matches the amount of power supplied corresponding to the threshold DM_th6 in the low-SOC area and so that the output P1 of the first energy storage device 5 matches the amount of power supplied which is obtained by subtracting the output P2 of the second energy storage device 6 from the amount of power supplied corresponding to the required output DM_dmd.

The control process during the power-running operation of the electric motor 3 in the first CS mode is executed in the way described above. In this control process, when the detected value of the first SOC falls within the low-SOC area, the output P2 of the second energy storage device 6 is retained at the base amount of power supplied P2_base, which is set in accordance with the detected value of the first SOC, if the amount of power supplied corresponding to the required output DM_dmd is less than or equal to the base amount of power supplied P2_base.

If the amount of power supplied corresponding to the required output DM_dmd is larger than the base amount of power supplied P2_base, the amount of power supplied corresponding to the required output DM_dmd, which is a portion of the base amount of power supplied P2_base, is supplied from only the second energy storage device 6 to the electric motor 3 and, also, the first energy storage device 5 is charged with the amount of power supplied which is obtained by subtracting the amount of power supplied corresponding to the required output DM_dmd from the base amount of power supplied P2_base. This can gradually restore the first SOC.

In this case, furthermore, high-accuracy adjustment of the rate of charging of the first energy storage device 5 is achievable by the power transmission controller 32 controlling the voltage converters 23 and 24. Accordingly, the first energy storage device 5 is charged at a low rate, resulting in the progression of deterioration of the first energy storage device 5 being more effectively suppressed than when the first energy storage device 5 is charged with the generated power output by the electric generator 4 by using the motive power of the internal combustion engine 2.

When the detected value of the first SOC falls within the high-SOC area, power is supplied preferentially from the first energy storage device 5 to the electric motor 3 if the required output DM_dmd is less than or equal to the threshold DM_th5.

This configuration can reduce the load on the second energy storage device 6 in the first CS mode, and prevent the second energy storage device 6 from generating excessive heat.

Control Process During Regenerative Operation in First CS Mode

Next, a control process executed by the power transmission controller 32 during the regenerative operation of the electric motor 3 in the first CS mode will be described in detail hereinafter with reference to FIGS. 14 and 15.

FIG. 14 is a map that defines how the regenerative power output by the electric motor 3 during the regenerative operation in the first CS mode is shared in order to charge the first energy storage device 5 and the second energy storage device 6 in accordance with the required amount of regeneration G_dmd of the electric motor 3 and the first SOC (the first SOC in the range between the CD→CS switching threshold B1_mc1 and the CS→CD switching threshold B1_mc2).

In FIG. 14, a diagonally hatched area represents an area where all or part of the regenerative power generated by the electric motor 3 is used to charge the first energy storage device 5, and a shaded area represents an area where all or part of the regenerative power is used to charge the second energy storage device 6.

On the map illustrated in FIG. 14, G_max2 is a maximum value of the required amount of regeneration G_dmd in the first CS mode. The maximum value G_max2 is a constant value when the first SOC is an SOC less than or equal to a predetermined value B1e that is slightly smaller than the CS→CD switching threshold B1_mc2. When the first SOC is larger than the value B1e, the maximum value G_max2 decreases in accordance with the increase in the first SOC.

Figure 15:
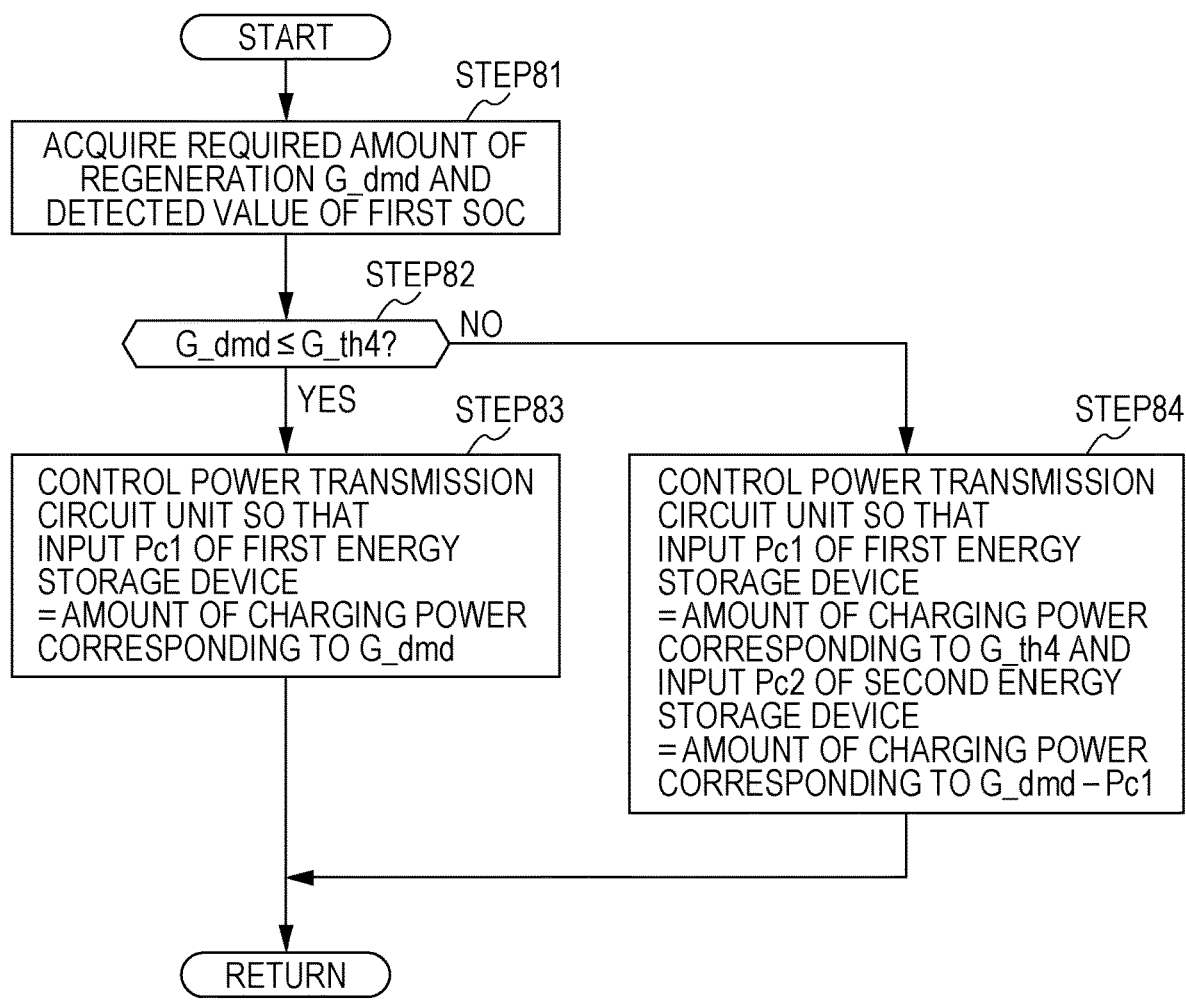
FIG. 15 is a flowchart illustrating a control process during regenerative operation of the electric motor in the first CS mode.

A control process for the power transmission controller 32 during the regenerative operation of the electric motor 3 in the first CS mode is sequentially executed in a predetermined control process cycle by using the map illustrated in FIG. 14 in accordance with a flowchart illustrated in FIG. 15.

In STEP81, the power transmission controller 32 acquires the required amount of regeneration G_dmd and a detected value of the first SOC.

Then, in STEP82, the power transmission controller 32 determines whether or not the required amount of regeneration G_dmd is less than or equal to a predetermined threshold G_th4.

In this embodiment, the threshold G_th4 is set in accordance with the first SOC. Specifically, as illustrated in the example in FIG. 14, the threshold G_th4 is set to a predetermined constant value when the first SOC is an SOC less than or equal to the predetermined value B1e. The constant value is determined to be a comparatively small value so as to allow the first energy storage device 5 to be charged at a low rate (low speed) to minimize the progression of deterioration of the first energy storage device 5.

When the first SOC is larger than the predetermined value B1e, the threshold G_th4 is set to successively decrease from the constant value to zero (reach zero at the CS→CD switching threshold B1_mc2) in accordance with the decrease in the first SOC.

The determination result of STEP82 is affirmative for the diagonally hatched area illustrated in FIG. 14. In this situation, in STEP83, the power transmission controller 32 controls the voltage converter 23 and the inverter 21 of the power transmission circuit unit 7 so that the input Pc1 of the first energy storage device 5 matches the amount of charging power corresponding to the required amount of regeneration G_dmd. In this case, the voltage converter 24 on the second energy storage device 6 side is controlled to block charging of the second energy storage device 6.

On the other hand, the determination result of STEP82 is negative for the shaded area illustrated in FIG. 14. In this situation, in STEP84, the power transmission controller 32 controls the voltage converters 23 and 24 and the inverter 21 of the power transmission circuit unit 7 so that the input Pc1 of the first energy storage device 5 matches the amount of charging power corresponding to the threshold G_th4 and so that the input Pc2 of the second energy storage device 6 matches the amount of charging power obtained by subtracting the input Pc1 of the first energy storage device 5 from the amount of charging power corresponding to the required amount of regeneration G_dmd.

The control process during the regenerative operation of the electric motor 3 in the first CS mode is executed in the way described above. This control process allows the first energy storage device 5 to be preferentially charged with regenerative power if the required amount of regeneration G_dmd is less than or equal to the threshold G_th4. In addition, the amount of charging power of the first energy storage device 5 is limited to a value less than or equal to the amount of charging power corresponding to the threshold G_th4. This can restore the first SOC while minimizing the progression of deterioration of the first energy storage device 5.

Control Process for Second CS Mode

Next, the control process for the second CS mode in STEP8 will be described in detail with reference to FIGS. 16 to 20.

The control device 8 determines a required driving force (required propulsion force) or required braking force of the entire vehicle in a way similar to that in the CD mode, and also determines the respective target operating states of the internal combustion engine 2, the electric motor 3, the electric generator 4, the clutch 11, and the brake device.

In the second CS mode, the control device 8 causes the internal combustion engine operation controller 31 to control the internal combustion engine 2 to successively perform the operation of the internal combustion engine 2. In addition to this, the control device 8 causes the power transmission controller 32 to control the electric generator 4 to continuously perform the power generation operation of the electric generator 4, except during the rotation operation of the electric motor 3. In this case, the power transmission controller 32 controls the voltage converter 24 and the inverter 22 of the power transmission circuit unit 7 so that only the second energy storage device 6, out of the first energy storage device 5 and the second energy storage device 6, is charged with the generated power corresponding to the target value.

In the vehicle driving request state (in the state where the required driving force is not zero), the control device 8 determines the respective shares of the required driving force of the entire vehicle that are taken on by the electric motor 3 and the internal combustion engine 2 in accordance with the required driving force of the entire vehicle, the detected value of the first SOC, and so on.

In this case, the respective shares for the electric motor 3 and the internal combustion engine 2 are determined so that, basically, all or a large portion of the required driving force is taken on by the internal combustion engine 2 and the electric motor 3 serves in an auxiliary role.

The control device 8 causes the internal combustion engine operation controller 31 to perform control so that the motive power (output torque) of the internal combustion engine 2 is equal to motive power including the motive power corresponding to the share of the required driving force for the internal combustion engine 2 and the motive power necessary for the power generation operation of the electric generator 4, and also causes the clutch controller 33 to control the clutch 11 to enter the connected state.

Further, the control device 8 determines the required output DM_dmd of the electric motor 3 so that the share of the required driving force for the electric motor 3 is satisfied by the motive power generated through the power-running operation of the electric motor 3.

Figure 16:
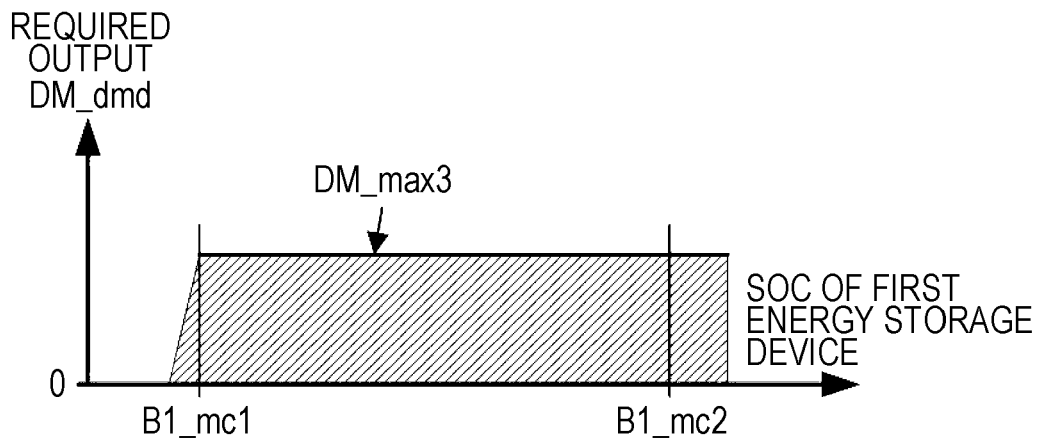
FIG. 16 illustrates a map used in a control process when power is supplied to the electric motor in a second CS mode.

Then, the control device 8 causes the power transmission controller 32 to control the inverter 21 on the electric motor 3 side and the voltage converter 23 of the power transmission circuit unit 7 to supply power from only the first energy storage device 5 to the electric motor 3 in accordance with a pre-created map illustrated in FIG. 16 on the basis of the required output DM_dmd and the detected value of the SOC of the first energy storage device 5 (i.e., the first SOC).

In the vehicle braking request state (in the state where the required braking force is not zero), the control device 8 determines the respective shares of the required braking force of the entire vehicle for the electric motor 3 and the brake device. In this case, the control device 8 determines the respective shares for the electric motor 3 and the brake device on the basis of the magnitude of the required braking force, the detected value of the first SOC, and so on so as to basically maximize the share of the required braking force for the electric motor 3.

Then, the control device 8 causes the brake controller 34 to control the brake device in accordance with the share of the required braking force for the brake device.

Further, the control device 8 determines the required amount of regeneration G_dmd of the electric motor 3 so that the share of the required braking force for the electric motor 3 is satisfied by the regenerative braking force generated through the regenerative operation of the electric motor 3.

Figure 18:
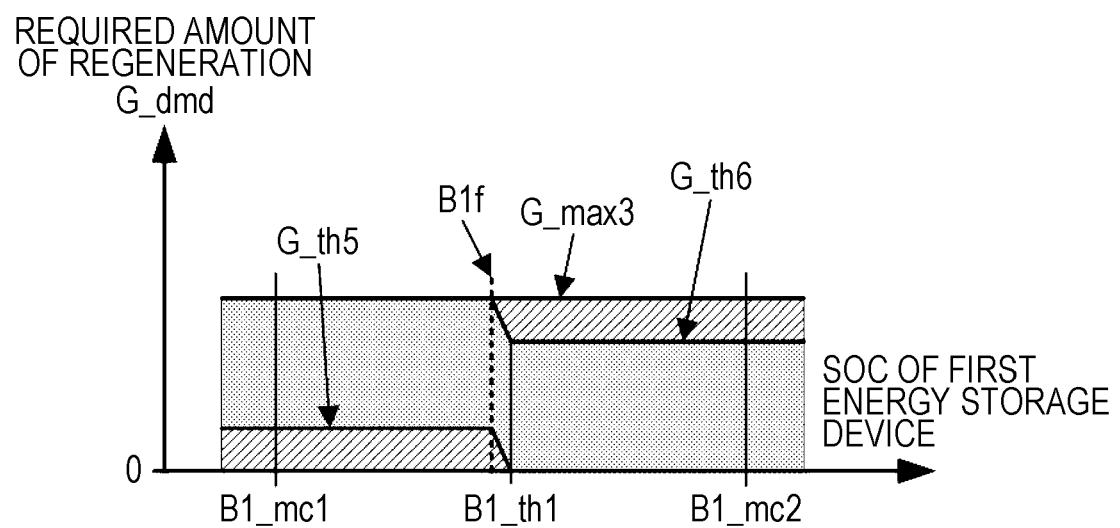
FIG. 18 illustrates a map used in a control process during regenerative operation of the electric motor in the second CS mode.

Then, the control device 8 causes the power transmission controller 32 to control the inverter 21 on the electric motor 3 side and the voltage converters 23 and 24 of the power transmission circuit unit 7 to charge either or both of the first energy storage device 5 and the second energy storage device 6 with the regenerative power output from the electric motor 3 in accordance with a pre-created map illustrated in FIG. 18 on the basis of the required amount of regeneration G_dmd and the detected value of the first SOC. In this embodiment, the primary energy storage device to be charged with the regenerative power in the second CS mode is the second energy storage device 6.

Control Process During Power-Running Operation in Second CS Mode

A control process executed by the power transmission controller 32 during the power-running operation of the electric motor 3 in the second CS mode will be described in detail hereinafter with reference to FIGS. 16 and 17.

FIG. 16 illustrates a map depicting how the output demand for the amount of electricity to be supplied (the amount of power supplied) to the electric motor 3 is shared by the first energy storage device 5 and the second energy storage device 6 in the second CS mode in accordance with the required output DM_dmd of the electric motor 3 and the first SOC.

In FIG. 16, a diagonally hatched area represents an area where all the amount of power supplied to the electric motor 3 is taken on by the first energy storage device 5. On the map illustrated in FIG. 16, DM_max1 is a maximum value of the required output DM_dmd in the second CS mode. The maximum value DM_max1 is a constant value.

In the control process during the power-running operation of the electric motor 3 in the second CS mode, as illustrated in FIG. 16, the amount of power supplied to the electric motor 3 is always taken on only by the first energy storage device 5 within the entire range between the CD→CS switching threshold B1_mc1 (see FIG. 2) and the CS→CD switching threshold B1_mc2 (see FIG. 2) for the first SOC. In the second CS mode, accordingly, power supply from the second energy storage device 6 to the electric motor 3 is disabled.

Figure 17:
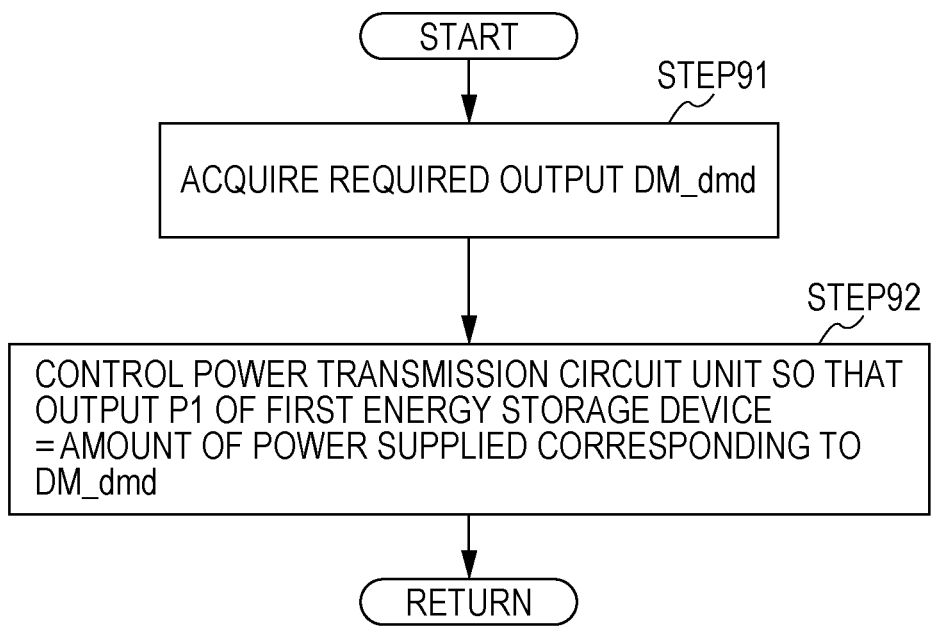
FIG. 17 is a flowchart illustrating a control process when power is supplied to the electric motor in the second CS mode.

The control process for the power transmission controller 32 during the power-running operation of the electric motor 3 in the second CS mode is sequentially executed in a predetermined control process cycle in accordance with a flowchart illustrated in FIG. 17.

In STEP91, the power transmission controller 32 acquires the required output DM_dmd. Then, in STEP92, the power transmission controller 32 controls the voltage converter 23 and the inverter 21 of the power transmission circuit unit 7 so that the output P1 of the first energy storage device 5 matches the amount of power supplied corresponding to the required output DM_dmd.

The control process during the power-running operation of the electric motor 3 in the second CS mode is executed in the way described above. In this control process, power supply from the second energy storage device 6 to the electric motor 3 is disabled. This can quickly restore the SOC of the second energy storage device 6 with the generated power of the electric generator 4.

Control Process During Regenerative Operation in Second CS Mode

Next, a control process executed by the power transmission controller 32 during the regenerative operation of the electric motor 3 in the second CS mode will be described in detail hereinafter with reference to FIGS. 18 and 19.

FIG. 18 is a map that defines how the regenerative power output by the electric motor 3 during the regenerative operation in the second CS mode is shared in order to charge the first energy storage device 5 and the second energy storage device 6 in accordance with the required amount of regeneration G_dmd of the electric motor 3 and the first SOC (the first SOC in the range between the CD→CS switching threshold B1_mc1 and the CS→CD switching threshold B1_mc2).

In FIG. 18, diagonally hatched areas represent areas where all or part of the regenerative power generated by the electric motor 3 is used to charge the first energy storage device 5, and a shaded area represents an area where all or part of the regenerative power is used to charge the second energy storage device 6.

On the map illustrated in FIG. 18, G_max3 is a maximum value of the required amount of regeneration G_dmd in the second CS mode. The maximum value G_max3 is a constant value.

Figure 19:
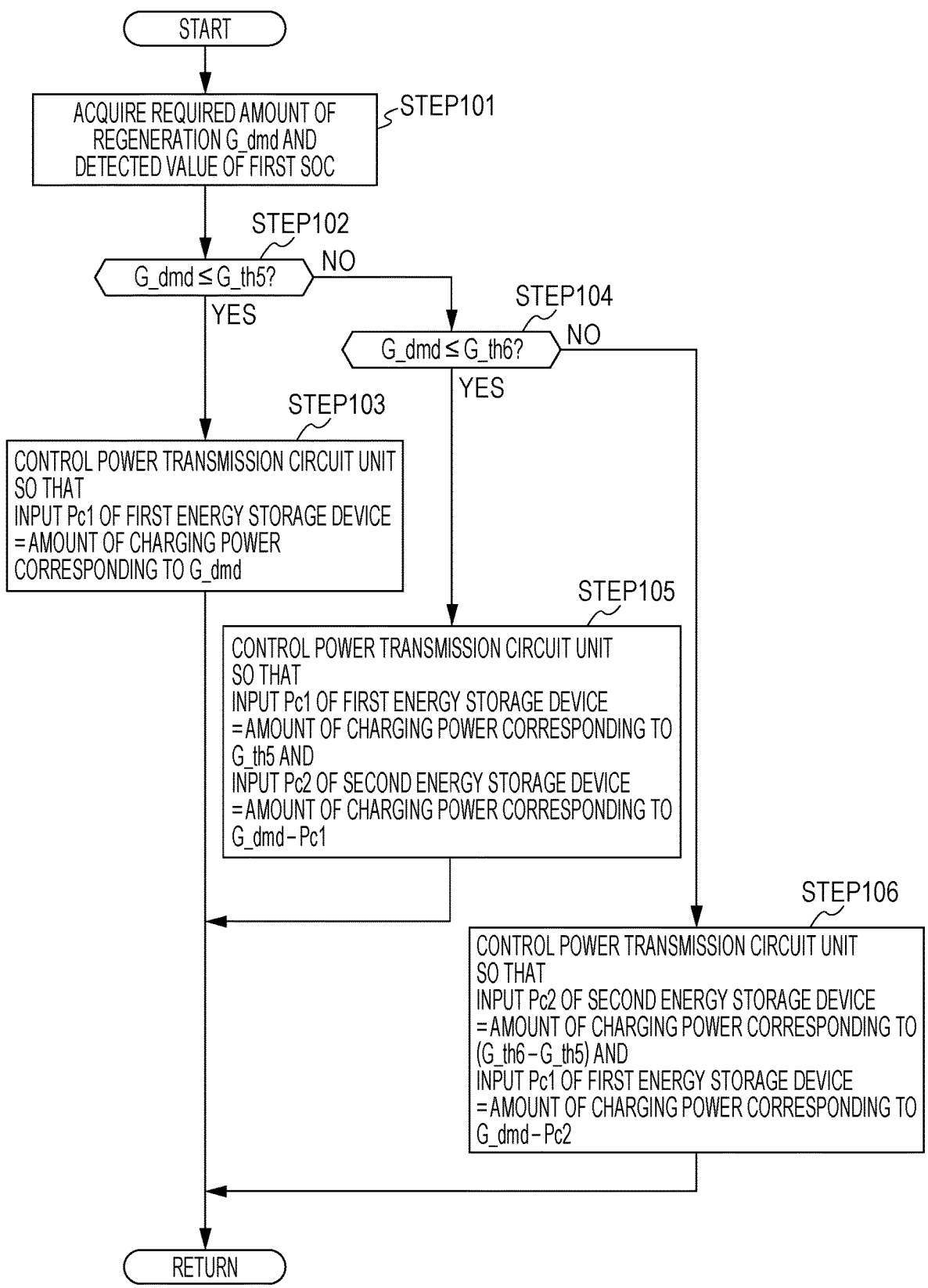
FIG. 19 is a flowchart illustrating a control process during regenerative operation of the electric motor in the second CS mode.

A control process for the power transmission controller 32 during the regenerative operation of the electric motor 3 in the second CS mode is sequentially executed in a predetermined control process cycle by using the map illustrated in FIG. 18 in accordance with a flowchart illustrated in FIG. 19.

In STEP101, the power transmission controller 32 acquires the required amount of regeneration G_dmd and a detected value of the first SOC.

Then, in STEP102, the power transmission controller 32 determines whether or not the required amount of regeneration G_dmd is less than or equal to a predetermined threshold G_th5.

In this embodiment, the threshold G_th5 is set in accordance with the first SOC. Specifically, as illustrated in the example in FIG. 18, the threshold G_th5 is set to a predetermined constant value when the first SOC is an SOC less than or equal to a predetermined value B1f that is slightly smaller than the threshold B1_th1. The constant value is determined to be a comparatively small value so as to allow the first energy storage device 5 to be charged at a low rate (low speed) to minimize the progression of deterioration of the first energy storage device 5.

When the first SOC is larger than the predetermined value B1f, the threshold G_th5 is set to successively decrease from the constant value to zero (reach zero at the threshold B1_th1) in accordance with the increase in the first SOC. When the first SOC is an SOC greater than or equal to the threshold B1_th1, the threshold G_th5 is kept at zero.

The determination result of STEP102 is affirmative for the lower diagonally hatched area illustrated in FIG. 18. In this situation, in STEP103, the power transmission controller 32 controls the voltage converter 23 and the inverter 21 of the power transmission circuit unit 7 so that the input Pc1 of the first energy storage device 5 matches the amount of charging power corresponding to the required amount of regeneration G_dmd. In this case, the voltage converter 24 on the second energy storage device 6 side is controlled to block charging of the second energy storage device 6.

For additional explanation, when the detected value of the first SOC is greater than or equal to the threshold B1_th1, the threshold G_th5 is zero and thus no affirmative determination is made in STEP102. Thus, in this case, the processing of STEP103 is not executed.

If the determination result of STEP102 is negative, then, in STEP104, the power transmission controller 32 determines whether or not the required amount of regeneration G_dmd is less than or equal to a predetermined threshold G_th6.

In this embodiment, the threshold G_th6 is set in accordance with the first SOC in a way similar to that for the threshold G_th5 in STEP102 described above. Specifically, as illustrated in the example in FIG. 18, when the first SOC is an SOC greater than or equal to the threshold B1_th1, the threshold G_th6 is set to a predetermined constant value. The constant value is set so that the amount of charging power corresponding to the difference between the threshold G_th6 and the maximum value G_max1 of the required amount of regeneration G_dmd (=G_max3−G_th6) matches the amount of charging power corresponding to the maximum value of the threshold G_th5 (the value of the threshold G_th5 when the first SOC is less than or equal to the threshold B1f) (the amount of charging power by which the first energy storage device 5 can be charged at a low rate).

When the first SOC is smaller than the threshold B1_th1, the threshold G_th6 is set to increase to the maximum value G_max1 (reach the maximum value G_max1 at the threshold B1f) in accordance with the decrease in the first SOC in a pattern similar to the pattern in which the threshold G_th5 changes. When the first SOC is less than or equal to the threshold B1f, the threshold G_th6 is maintained at the maximum value G_max1.

The thresholds G_th5 and G_th6 are set so that, within the range of B1f to B1_th1 of the first SOC, the thresholds G_th5 and G_th6 are set so that the sum of the amount of charging power corresponding to the difference between the maximum value G_max1 and the threshold G_th6 (=G_max1−G_th6) and the amount of charging power corresponding to the threshold G_th5 matches the amount of charging power corresponding to the maximum value of the threshold G_th5 (the amount of charging power by which the first energy storage device 5 can be charged at a low rate).

The determination result of STEP104 is affirmative for the shaded area illustrated in FIG. 18. In this situation, in STEP105, the power transmission controller 32 controls the voltage converters 23 and 24 and the inverter 21 of the power transmission circuit unit 7 so that the input Pc1 of the first energy storage device 5 matches the amount of charging power corresponding to the threshold G_th5 and so that the input Pc2 of the second energy storage device 6 matches the amount of charging power obtained by subtracting the input Pc1 of the first energy storage device 5 from the amount of charging power corresponding to the required amount of regeneration G_dmd.

On the other hand, the determination result of STEP104 is negative for the upper diagonally hatched area illustrated in FIG. 18. In this situation, in STEP106, the power transmission controller 32 controls the voltage converters 23 and 24 and the inverter 21 of the power transmission circuit unit 7 so that the input Pc2 of the second energy storage device 6 matches the amount of charging power corresponding to the difference between the thresholds G_th5 and G_th6 (=G_th6−G_th5) and so that the input Pc1 of the first energy storage device 5 matches the amount of charging power obtained by subtracting the input Pc2 of the second energy storage device 6 from the amount of charging power corresponding to the required amount of regeneration G_dmd.

For additional explanation, when the first SOC is less than or equal to the predetermined value B1f, the threshold G_th6 matches the maximum value G_max3 and thus no negative determination is made in STEP104. Thus, in this case, the processing of STEP106 is not executed.

The control process during the regenerative operation of the electric motor 3 in the second CS mode is executed in the way described above. In this control process, when the detected value of the first SOC is larger than the threshold B1_th1, all or a large portion of the regenerative power is used to charge the second energy storage device 6. Thus, the SOC of the second energy storage device 6 may be effectively restored with regenerative power.

In the second CS mode, the second energy storage device 6 is charged with generated power produced by the electric generator 4, except during the regenerative operation of the electric motor 3. Both the generated power and the regenerative power can be used to quickly restore the SOC of the second energy storage device 6 toward the CS2→CS1 switching threshold B2_mc2.

When the detected value of the first SOC is smaller than the threshold B1_th1, the first energy storage device 5 is preferentially charged with regenerative power within the range where the required amount of regeneration G_dmd is less than or equal to the threshold G_th5. Further, when the detected value of the first SOC is larger than the predetermined value B1f, the first energy storage device 5 is charged with regenerative power within the range where the required amount of regeneration G_dmd is larger than the threshold G_th6. The amount of charging power of the first energy storage device 5 is limited to a value less than or equal to the amount of charging power corresponding to the maximum value of the threshold G_th5. This can suppress a reduction in the first SOC in the second CS mode while minimizing the progression of deterioration of the first energy storage device 5.

A detailed description has been made of the control process for the control device 8 in this embodiment.

In this embodiment, the range of the first SOC (the range of B1*a* (%) to B1*b* (%) illustrated in FIG. 2) used for supplying power to the electric motor 3 in the CD mode is larger than the range of the second SOC (the range of B2*a* (%) to B2*b* (%) illustrated in FIG. 2) used for supplying power to the electric motor 3 in the CD mode. Further, the range of the second SOC (the range of B2*b* (%) to B2*c* (%) illustrated in FIG. 2) used for supplying power to the electric motor 3 in the CS mode is larger than the range of the first SOC (part of the range less than or equal to B*i*b (%) illustrated in FIG. 2) used for supplying power to the electric motor 3 in the CS mode.

Furthermore, power to be supplied to the electric generator 4, which serves as a starter actuator, when the internal combustion engine 2 is started in the CS mode is reserved in only the second energy storage device 6.

For this reason, a large portion of the power (stored energy) in the first energy storage device 5 with relatively high energy density can be utilized as power to be supplied to the electric motor 3 in the CD mode. As a result, the period during which power can be supplied from the first energy storage device 5 to the electric motor 3 in the CD mode, and therefore the drivable range of the vehicle in the CD mode in which fuel consumption of the internal combustion engine 2 does not occur or is suppressed, can be maximized. In addition, the environmental performance of the motive power system 1 is improved.

In addition, part of the power in the second energy storage device 6 (the stored energy within the range of B2*a* (%) to B2*b* (%) illustrated in FIG. 2) is usable as dedicated power to be supplied to the electric motor 3 in the CD mode. This allows power to be supplied from the second energy storage device 6 with relatively high power density to the electric motor 3 in an auxiliary manner, as necessary. Thus, the running performance of the vehicle (the driving performance of the drive wheel DW) in the CD mode can be enhanced.

In the first CS mode within the CS mode, the second energy storage device 6 can be used as the primary power supply for the electric motor 3. Thus, the motive power of the electric motor 3 can be transmitted to the drive wheel DW in an auxiliary manner with high responsivity to a change in the required driving force of the vehicle. As a result, the running performance of the vehicle (the driving performance of the drive wheel DW) in the first CS mode can be enhanced.

In addition, part of the power in the first energy storage device 5 (part of the range less than or equal to B*i*b (%) illustrated in FIG. 2) is usable as power to be supplied to the electric motor 3 in the CS mode. This allows power to be supplied, in particular, in the second CS mode, from the first energy storage device 5, instead of the second energy storage device 6, to the electric motor 3, as necessary. This can eliminate power supply from the second energy storage device 6 to the electric motor 3 in the second CS mode. Thus, restoration of the SOC of the second energy storage device 6 in the second CS mode can be accelerated.

In this embodiment, furthermore, in the second CS mode, the generated power of the electric generator 4 is used to charge only the second energy storage device 6. Part of the power used to charge the second energy storage device 6 in this manner is transferred from the second energy storage device 6 to the first energy storage device 5 in the first CS mode. In this case, in the first CS mode, the first energy storage device 5 can be charged stably at a low rate. This can minimize the progression of deterioration of the first energy storage device 5.

Figure 20:
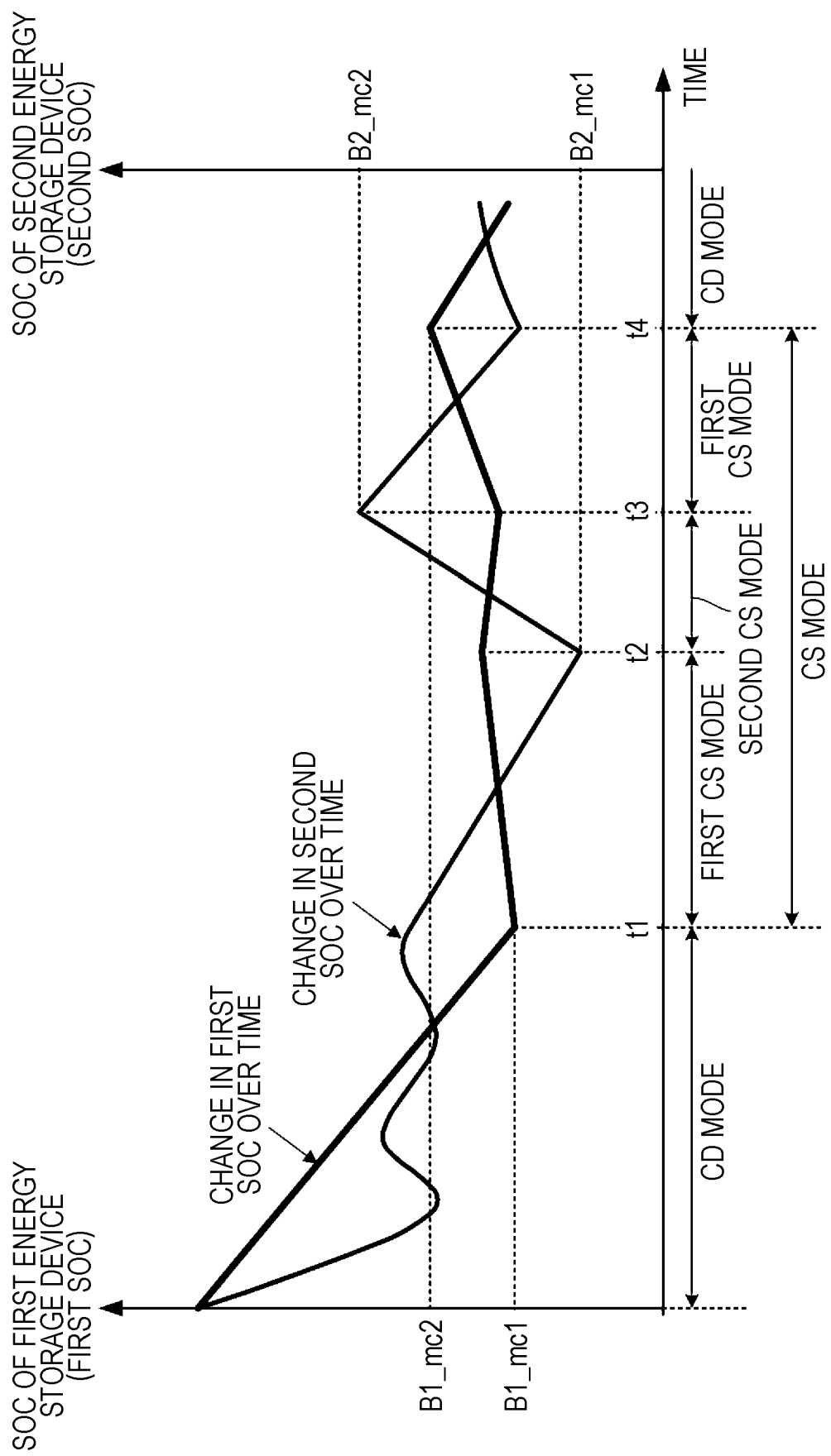
FIG. 20 is a graph exemplifying patterns in which the respective SOCs of the first energy storage device and the second energy storage device change over time.

FIG. 20 is a graph exemplifying schematic changes in the respective SOCs of the first energy storage device 5 and the second energy storage device 6 over time during the travel of the vehicle.

The period up to time t1 is the period of the CD mode. During this period, the first SOC decreases basically. The second SOC changes in response to appropriate discharging and charging of the second energy storage device 6.

When the first SOC decreases to the CD→CS switching threshold B1_mc1 at time t1, the mode of the control process for the control device 8 is switched to the first CS mode. The period from time t1 to time t2 is the period of the first CS mode. During the period of the first CS mode, the second SOC basically decreases in response to power supply to either or both of the first energy storage device 5 and the electric motor 3. The first SOC is gradually restored in response to appropriate charging of the first energy storage device 5 with power supplied from the second energy storage device 6.

When the second SOC decreases to the CS1→CS2 switching threshold B2_mc1 at time t2, the mode of the control process for the control device 8 is switched to the second CS mode. The period from time t2 to time t3 is the period of the second CS mode. During the period of the second CS mode, the second SOC increases in response to charging of the second energy storage device 6 with generated power and regenerative power.

In the second CS mode, the first SOC decreases in a situation where power is supplied from the first energy storage device 5 to the electric motor 3. In the second CS mode, however, since the second SOC is quickly restored by the generated power and the regenerative power, power supply from the first energy storage device 5 to the electric motor 3 is not frequently required in most cases. Thus, the reduction in the first SOC in the second CS mode does not so often occur.

When the second SOC is restored to the CS2→CS1 switching threshold B2_mc2 at time t3, the mode of the control process for the control device 8 is switched to the first CS mode again. The period from time t3 to time t4 is the period of the first CS mode. During the period of the first CS mode, as in the period from time t1 to time t2, the second SOC decreases in response to power supply to either or both of the first energy storage device 5 and the electric motor 3, and the first SOC is gradually restored.

In the illustrated example, at time t4, the first SOC is restored to the CS→CD switching threshold B1_mc2. In response to the restoration, the mode of the control process for the control device 8 is returned to the CD mode.

As described above, in the CS mode subsequent to the CD mode, the first SOC can be gradually restored basically by alternately repeating the first CS mode and the second CS mode. As a result, the travel of the vehicle can be restarted in the CD mode in which only the motive power of the electric motor 3 is used to drive the drive wheel DW.

Modifications

There will now be described some modifications related to the embodiment described above.

In the description of the embodiment described above, the motive power system 1 including the internal combustion engine 2 and the electric generator 4 is an example of a power supply system according to the embodiments disclosed herein. Alternatively, the motive power system 1 (power supply system) may only include the electric motor 3 (actuator) as a source of motive power for driving the drive wheels DW (driven load). In other words, the motive power system 1 may be mounted in an electric powered vehicle. In this case, the motive power system (power supply system) does not have a CS mode.

In addition, the electrical load according to the embodiments disclosed herein is not limited to an actuator and may be an electric device that does not output mechanical motive power.

In the embodiment described above, the supply of power for causing the electric generator 4 to operate as a starter actuator is taken on only by the second energy storage device 6. Alternatively, part of the power to be supplied to the electric generator 4 may also be taken on by the first energy storage device 5. In this case, it is desirable that the load on the first energy storage device 5 be less than the load on the second energy storage device 6.

For utmost utilization of the power in the first energy storage device 5 in the CD mode, it is desirable that all the power to be supplied to the electric generator 4 be taken on by the second energy storage device 6.

In the embodiment described above, furthermore, power is supplied from only the first energy storage device 5 to the electric motor 3 (discharge from the second energy storage device 6 is disabled) during the power-running operation of the electric motor 3 in the second CS mode. However, for example, if the required output DM_dmd is large, the amount of power supplied corresponding to part of the required output DM_dmd may be supplied from the second energy storage device 6 to the electric motor 3.

In the description of the embodiment described above, a transportation apparatus including the motive power system 1 (power supply system) is a hybrid vehicle, by way of example. The transportation apparatus is not limited to a vehicle and may be a ship, a railway carriage, or any other apparatus. The driven load may not necessarily be the drive wheel DW of a vehicle. The actuator may be an actuator other than an electric motor.

A power supply system according to an aspect of the embodiments disclosed herein includes a first energy storage device, a second energy storage device having a higher power density and a lower energy density than the first energy storage device, a power transmission circuit unit having a function of performing power transmission among an electrical load, the first energy storage device, and the second energy storage device, the electrical load being operated in response to power supplied from at least one of the first energy storage device and the second energy storage device, and a control device having a function of controlling the power transmission circuit unit, wherein the control device is configured to have a function of executing a first control process and a function of executing a second control process, the first control process being a process for controlling the power transmission circuit unit to, when a second charge rate that is a charge rate of the second energy storage device is lower than a predetermined first threshold, supply an amount of power supplied corresponding to a required output of the electrical load from the first energy storage device to the electrical load while charging the second energy storage device with power supplied from the first energy storage device, the second control process being a process for controlling the power transmission circuit unit to, when the second charge rate is higher than the first threshold, supply the amount of power supplied corresponding to the required output from at least the first energy storage device, out of the first energy storage device and the second energy storage device, to the electrical load (a first aspect of the embodiments).

In the embodiments, the "power transmission circuit unit" having a function of performing power transmission among the first energy storage device, the second energy storage device, and the actuator refers to the "power transmission circuit unit" having a function capable of controlling the amount of power supplied from each of the first energy storage device and the second energy storage device to an actuator and a function capable of controlling selective switching of the source and destination of power among the first energy storage device, the second energy storage device, and the actuator.

Further, the term "amount of power supplied" refers to the amount of electricity supplied from the first energy storage device or the second energy storage device to the target to which power is supplied. In this case, the target to which power is supplied is not limited to the actuator and may be an energy storage device (the first energy storage device or the second energy storage device). The "amount of electricity" or the "amount of power supplied" is expressed as an amount of electrical energy per unit time (e.g., a value of power) or an amount of charge per unit time (e.g., a value of current), for example.

The "required output" of the electrical load refers to what defines a request value of the amount of electricity required for the electrical load to operate. The request value of the amount of electricity itself may be used as the "required output". If the electrical load is designed to generate, for example, mechanical output (motive power or kinetic energy) corresponding to the amount of electricity to be supplied, a request value of the mechanical output can also be used as the "required output" of the electrical load.

Further, the amount of power supplied corresponding to the "required output" refers to the amount of power to be supplied to the electrical load to realize the "required output". Furthermore, the amount of power supplied corresponding to a certain threshold (such as an A-th threshold described below) for the required output refers to the amount of power supplied corresponding to a required output when the required output matches the threshold.

According to the first aspect of the embodiments, when the second charge rate is lower than the first threshold, the first control process is executed and thus the second energy storage device is charged with power from the first energy storage device. This may prevent the charge rate of the second energy storage device from being too low.

When the second charge rate is higher than the first threshold, the second control process is executed and thus the amount of power supplied corresponding to the required output is supplied from either or both energy storage devices including at least the first energy storage device to the electrical load. This enables power to be supplied to the electrical load so as not to cause the load on the second energy storage device with relatively high power density to become excessive.

Thus, it is possible to reduce the total amount of heat generation (power loss) of the first energy storage device and the second energy storage device while preventing the charge rate of the second energy storage device from being too low.

Accordingly, the first aspect of the embodiments enables power to be supplied from two energy storage devices having different characteristics to an electrical load in an appropriate manner.

In the first aspect of the embodiments, preferably, the control device is configured to control the power transmission circuit unit to, in the second control process, supply power from only the first energy storage device to the electrical load when the required output is less than a predetermined A-th threshold and supply power from both of the first energy storage device and the second energy storage device to the electrical load when the required output is greater than the A-th threshold (a second aspect of the embodiments).

According to this configuration, when the second charge rate is higher than the first threshold, the amount of power supplied from the second energy storage device to the electrical load is limited to that obtained when the required output is greater than the A-th threshold. This can effectively reduce the load on the second energy storage device. Thus, the effect of reducing the total amount of heat generation (power loss) of the first energy storage device and the second energy storage device can be enhanced.

In the second aspect of the embodiments, preferably, the control device is configured to control the power transmission circuit unit to, in the second control process, when the required output is greater than the A-th threshold and is less than a predetermined B-th threshold larger than the A-th threshold, supply an amount of power supplied corresponding to the A-th threshold from the first energy storage device to the electrical load and supply an amount of power supplied corresponding to a difference between the required output and the A-th threshold from the second energy storage device to the electrical load (a third aspect of the embodiments).

The amount of power supplied corresponding to a difference between the required output and the A-th threshold refers to, specifically, the amount of power supplied which is equal to the difference between the amount of power supplied corresponding to the required output and the amount of power supplied corresponding to the A-th threshold. The same applies to the amount of power supplied corresponding to the difference between the required output and a certain threshold or the amount of power supplied corresponding to the difference between any two thresholds for the required output in the following description.

According to the third aspect of the embodiments, accordingly, if the required output is greater than the A-th threshold and is less than a predetermined B-th threshold larger than the A-th threshold, the supply of only the amount of power supplied corresponding to the difference between the required output and the A-th threshold is taken on by the second energy storage device. This can prevent the load placed on the second energy storage device from abruptly increasing when the required output exceeds the B-th threshold.

Thus, the effect of reducing the total amount of heat generation (power loss) of the first energy storage device and the second energy storage device can be enhanced. In addition, power supply from the second energy storage device to the electrical load can prevent the charge rate of the second energy storage device from being maintained higher than the first threshold for a long term. Thus, the progression of deterioration of the second energy storage device can be suppressed.

Furthermore, there is no abrupt change in the amount of power supplied from the first energy storage device with relatively high energy density when the required output changes from one of below and above the A-th threshold to the other. This can suppress the progression of deterioration of the first energy storage device.

In the third aspect of the embodiments, preferably, the control device is configured to control the power transmission circuit unit to, in the second control process, when the required output is greater than the B-th threshold, supply an amount of power supplied corresponding to a difference between the B-th threshold and the A-th threshold from the second energy storage device to the electrical load and supply an amount of power supplied which is equal to a difference obtained by subtracting the amount of power supplied from the second energy storage device to the electrical load from the amount of power supplied corresponding to the required output from the first energy storage device to the electrical load (a fourth aspect of the embodiments).

According to this configuration, when the required output is greater than the B-th threshold, the amount of power supplied from the second energy storage device to the electrical load is limited to the amount of power supplied corresponding to the difference between the B-th threshold and the A-th threshold. This can prevent the load placed on the second energy storage device from becoming excessive. Thus, the effect of reducing the total amount of heat generation (power loss) of the first energy storage device and the second energy storage device can be enhanced.

Furthermore, there is no abrupt change in the amount of power supplied from the first energy storage device with relatively high energy density when the required output changes from one of below and above the B-th threshold to the other. This can suppress the progression of deterioration of the first energy storage device.

In the first to fourth aspects of the embodiments, preferably, the control device is configured to control the power transmission circuit unit so that, in the first control process, a change in an output of the first energy storage device in response to a change in the required output is less sensitive to a change in an input of the second energy storage device in response to a change in the required output (a fifth aspect of the embodiments).

The term "output of the first energy storage device" refers to an amount of electricity output from (the amount of power discharged from) the first energy storage device, and the term "input of the second energy storage device" refers to an amount of electricity used to charge the second energy storage device (an amount of charging power).

The fifth aspect of the embodiments can suppress frequent changes in the output of first energy storage device in response to a change in the required output during charging of the second energy storage device with power from the first energy storage device. Thus, the stability of the output of the first energy storage device with relatively high energy density can be increased, thereby suppressing the progression of deterioration of the first energy storage device.

In the first to fifth aspects of the embodiments, preferably, the control device is configured to control the power transmission circuit unit to, in the first control process, supply, while outputting from the first energy storage device a predetermined base amount of power supplied that is set regardless of the required output of the electrical load, the amount of power supplied corresponding to the required output, which is part of the base amount of power supplied, to the electrical load and charge the second energy storage device with an amount of power supplied which is equal to a difference obtained by subtracting the amount of power supplied corresponding to the required output from the base amount of power supplied (a sixth aspect of the embodiments).

According to this configuration, in the first control process, the first energy storage device outputs a predetermined base amount of power supplied that is set regardless of the required output. This can suppress frequent changes in the output of the first energy storage device in response to a change in the required output. Thus, as in the fifth aspect of the embodiments, the stability of the output of the first energy storage device with relatively high energy density can be increased, thereby suppressing the progression of deterioration of the first energy storage device. In addition, since the second energy storage device can be charged, the progression of deterioration of the second energy storage device can be suppressed.

In the sixth aspect of the embodiments, preferably, the control device is configured to have a function of variably setting the base amount of power supplied in accordance with the second charge rate in the first control process (a seventh aspect of the embodiments).

This configuration enables a portion of the base amount of power supplied that is used to charge the second energy storage device to be adjusted in accordance with the charge rate of the second energy storage device.

In the seventh aspect of the embodiments, more specifically, preferably, the control device is configured to have a function of setting the base amount of power supplied so that, in the first control process, the base amount of power supplied when the second charge rate is lower than a predetermined second threshold smaller than the first threshold has a value larger than the base amount of power supplied when the second charge rate is higher than the second threshold (an eighth aspect of the embodiments).

According to this configuration, when the first charge rate is lower than the second threshold, a range of the required output within which the second energy storage device can be charged with power supplied from the first energy storage device is larger than that when the first charge rate is higher than the second threshold.

Thus, the charge rate of the second energy storage device is more likely to be kept within an intermediate range between the first threshold and the second threshold. This can prevent the charge rate of the second energy storage device from being excessive or insufficient, resulting in the progression of deterioration of the second energy storage device being suppressed.

In the eighth aspect of the embodiments, preferably, the control device is configured to set the base amount of power supplied so that, in the first control process, when the second charge rate falls within a range between the first threshold and the second threshold, the base amount of power supplied increases as the second charge rate decreases (a ninth aspect of the embodiments).

This configuration can enhance the effect of keeping the charge rate of the second energy storage device within the intermediate range between the first threshold and the second threshold. Thus, the progression of deterioration of the second energy storage device can be effectively suppressed.

In the ninth aspect of the embodiments, preferably, the control device is configured to control the power transmission circuit unit to, when the second charge rate falls within the range between the first threshold and the second threshold, if the amount of power supplied corresponding to the required output is greater than the base amount of power supplied and is less than a predetermined C-th threshold, supply power from only the first energy storage device, out of the first energy storage device and the second energy storage device, to the electrical load and, if the amount of power supplied corresponding to the required output is greater than the base amount of power supplied and is greater than the predetermined C-th threshold, supply power from both of the first energy storage device and the second energy storage device to the electrical load (a tenth aspect of the embodiments).

According to this configuration, when the second charge rate falls within a range between the first threshold and the second threshold, even though the required output is greater than the base amount of power supplied, power is supplied from only the first energy storage device to the electrical load if the required output is less than the C-th threshold. This can reduce the load on the first energy storage device (and therefore can reduce a reduction in the amount of heat generation). In addition, the charge rate of the first energy storage device is more likely to be kept within the range between the first threshold and the second threshold. This can enhance the progression of deterioration of the second energy storage device.

In the eighth to tenth aspects of the embodiments, preferably, the control device is configured to set the base amount of power supplied to a constant value in the first control process when the second charge rate is lower than the second threshold (an eleventh aspect of the embodiments).

According to this configuration, in the first control process when the second charge rate is lower than the second threshold, the base amount of power supplied, which is the output of the first energy storage device, is retained constant. This optimally stabilizes the output of the first energy storage device. Thus, the effect of suppressing the progression of deterioration of the first energy storage device can be enhanced. In addition, the charge rate of the second energy storage device is more likely to be kept within the range between the first threshold and the second threshold. This can enhance the effect of suppressing the progression of deterioration of the second energy storage device.

In the first to eleventh aspects of the embodiments, in a case where the electrical load is an electrical load capable of performing a regenerative operation for outputting regenerative power, preferably, the control device is configured to control the power transmission circuit unit to, during the regenerative operation of the electrical load when the second charge rate is higher than the first threshold, charge at least the first energy storage device with the regenerative power while limiting an amount of regenerative power used to charge the first energy storage device to a value less than or equal to a predetermined a-th threshold (a twelfth aspect of the embodiments).

According to this configuration, when the second charge rate is higher than the first threshold, that is, when the charge rate of the second energy storage device is high, the regenerative power is used to charge at least the second energy storage device. This can restore the charge rate of the second energy storage device. In this case, the amount of charging power of the first energy storage device is limited to a value less than or equal to a predetermined a-th threshold. This enables the first energy storage device to be charged at a comparatively low rate (low speed). Thus, the progression of deterioration of the first energy storage device due to charging can be suppressed.

The power supply system according to the first to twelfth aspects of the embodiments may further include an actuator that is the electrical load, an internal combustion engine, and a driven load drivable by motive power of at least one of the actuator and the internal combustion engine.

In this case, preferably, the control device is configured to have a function of controlling the power transmission circuit unit by using a charge-depleting (CD) mode and a charge-sustaining (CS) mode, the charge-depleting (CD) mode being a mode in which only motive power of the actuator, out of the internal combustion engine and the actuator, is usable as motive power for driving the driven load, the charge-sustaining (CS) mode being a mode in which motive power of the internal combustion engine and motive power of the actuator are usable as motive power for driving the driven load, and to execute the first control process and the second control process in the charge-depleting (CD) mode (a thirteenth aspect of the embodiments).

According to this configuration, in the CD mode, the charge rate of the second energy storage device is prevented from being too low. In the CS mode in which motive power of the internal combustion engine is usable as motive power for driving the driven load, the second energy storage device may be utilized as a primary power supply for causing the actuator to operate. In the CD mode, thus, the stored energy of the first energy storage device with relatively high energy density can be used as much as possible as energy for causing the actuator to operate.

As a result, the period during which power can be supplied to the actuator in the CD mode can be maximized.

In the CS mode, the second energy storage device with relatively high power density is usable as the primary power supply for the actuator. This enables motive power that may be supplementary to the motive power of the internal combustion engine to be generated from the actuator with high responsivity at any time.

In the first to thirteenth aspects of the embodiments described above, the electrical load or the actuator may be implemented as an electric motor, for example. The power transmission circuit unit may have a configuration that includes, for example, a voltage converter that converts an output voltage of at least one of the first energy storage device and the second energy storage device and outputs the resulting voltage, and an inverter that converts direct-current power input from the first energy storage device, the second energy storage device, or the voltage converter into alternating-current power and supplies the alternating-current power to the electrical load or the actuator.

Further, a transportation apparatus according to an aspect of the embodiments disclosed herein includes the power supply system according to the first to thirteenth aspects of the embodiments (a fourteenth aspect of the embodiments). This transportation apparatus is implementable as a transportation apparatus that achieves the advantages described above with reference to the first to thirteenth aspects of the embodiments.

Further, a power transmission method according to an aspect of the embodiments disclosed herein is a power transmission method for performing power transmission among an electrical load, a first energy storage device, and a second energy storage device in a power supply system, the power supply system including the first energy storage device and the second energy storage device, the second energy storage device having a higher power density and a lower energy density than the first energy storage device, the power supply system being configured to supply power from at least one of the first energy storage device and the second energy storage device to the electrical load. The power transmission method includes supplying, when a second charge rate that is a charge rate of the second energy storage device is lower than a predetermined first threshold, an amount of power supplied corresponding to a required output of the electrical load from the first energy storage device to the electrical load while charging the second energy storage device with power supplied from the first energy storage device; and supplying, when the second charge rate is higher than the first threshold, the amount of power supplied corresponding to the required output from at least the first energy storage device, out of the first energy storage device and the second energy storage device, to the electrical load (a fifteenth aspect of the embodiments).

Thus, advantages similar to those of the first aspect of the embodiments may be achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A power supply system comprising:
a first energy storage having a first power density and a first energy density;
a second energy storage having a second power density higher than the first power density and a second energy density lower than the first energy density;
a power transmission circuit via which an electrical load is connected to the first energy storage and to the second energy storage; and
circuitry configured to
control the power transmission circuit such that the first energy storage charges the second energy storage and supplies electric power to the electrical load according to a demand of the electrical load when a charge rate in the second energy storage is lower than or equal to a first threshold; and
control the power transmission circuit such that at least the first energy storage among the first energy storage and the second energy storage supplies electric power to the electrical load according to the demand when the charge rate is higher than the first threshold, wherein
the circuitry is configured to control the power transmission circuit to
supply, while outputting from the first energy storage a predetermined base amount of electric power supplied that is set regardless of the demand of the electrical load, the amount of electric power supplied corresponding to the demand, which is part of the base amount of electric power supplied, to the electrical load, and
charge the second energy storage with an amount of electric power supplied which is equal to a difference obtained by subtracting the amount of electric power supplied corresponding to the demand from the base amount of electric power supplied,
the circuitry is configured to have a function of variably setting the base amount of electric power supplied in accordance with the charge rate, and
the circuitry is configured to have a function of setting the base amount of electric power supplied so that the base amount of electric power supplied when the charge rate is lower than a predetermined second threshold smaller than the first threshold has a value larger than the base amount of electric power supplied when the charge rate is higher than the second threshold.

2. The power supply system according to claim 1, wherein
the circuitry is configured to control the power transmission circuit, when the charge rate is higher than the first threshold, to,
supply electric power from both of the first energy storage and the second energy storage to the electrical load when the demand is greater than a predetermined A-th threshold, and supply electric power from only the first energy storage to the electrical load when the demand is less than the A-th threshold such that, when the charge rate is higher than the first threshold, an amount of power supplied from the second energy storage to the electrical load is limited to a situation when the demand is greater than the A-th threshold.

3. The power supply system according to claim 1, wherein the circuitry is configured to control the power transmission circuit to, when the demand is greater than the A-th threshold and is less than a predetermined B-th threshold larger than the A-th threshold, supply an amount of electric power supplied corresponding to the A-th threshold from the first energy storage to the electrical load, and supply an amount of electric power supplied corresponding to a difference between the demand and the A-th threshold from the second energy storage to the electrical load.

4. The power supply system according to claim 3, wherein the circuitry is configured to control the power transmission circuit to, when the demand is greater than the B-th threshold, supply a first amount of electric power supplied corresponding to a difference between the B-th threshold and the A-th threshold from the second energy storage to the electrical load, and supply a second amount of electric power from the first energy storage to the electrical load such that a total amount of the first amount and the second amount corresponds to the demand.

5. The power supply system according to claim 1, wherein the circuitry is configured to control the power transmission circuit so that a first responsiveness of an output of the first energy storage to a change in the demand is lower than a second responsiveness of an input of the second energy storage to the change in the demand.

6. The power supply system according to claim 1, wherein the circuitry is configured to set the base amount of electric power supplied so that when the charge rate falls within a range between the first threshold and the second threshold, the base amount of electric power supplied increases as the charge rate decreases.

7. The power supply system according to claim 6, wherein the circuitry is configured to control the power transmission circuit to when the charge rate falls within the range between the first threshold and the second threshold, if the amount of electric power supplied corresponding to the demand is greater than the base amount of electric power supplied and is less than a predetermined C-th threshold, supply power from only the first energy storage, out of the first energy storage and the second energy storage, to the electrical load, and if the amount of electric power supplied corresponding to the demand is greater than the base amount of electric power supplied and is greater than the predetermined C-th threshold, supply power from both of the first energy storage and the second energy storage to the electrical load.

8. The power supply system according to claim 1, wherein the circuitry is configured to set the base amount of electric power supplied to a constant value when the charge rate is lower than the second threshold.

9. The power supply system according to claim 1, wherein the electrical load performs a regenerative operation for outputting regenerative power, and wherein the circuitry is configured to control the power transmission circuit to, during the regenerative operation of the electrical load when the charge rate is higher than the first threshold, charge at least the first energy storage with the regenerative power while limiting an amount of regenerative power used to charge the first energy storage to a value less than or equal to a predetermined a-th threshold.

10. The power supply system according to claim 1, further comprising:

an actuator that comprises the electrical load;

an internal combustion engine; and a driven load drivable by motive power of at least one of the actuator or the internal combustion engine, wherein the circuitry is configured to have a function of controlling the power transmission circuit by using a charge-depleting mode and a charge-sustaining mode, the charge-depleting mode being a mode in which only motive power of the actuator, out of the internal combustion engine and the actuator, is usable as motive power for driving the driven load, the charge-sustaining mode being a mode in which motive power of the internal combustion engine and motive power of the actuator are usable as motive power for driving the driven load, and control the power transmission circuit to transmit electric power among the first energy storage, the second energy storage, and the electrical load in the charge-depleting mode.

11. A transportation apparatus comprising the power supply system according to claim 1.

12. The power supply system according to claim 1, wherein the second energy storage includes a capacitor.

13. The power supply system according to claim 1, wherein the first threshold is a fixed value.

* * * * *